US011807775B2

(12) United States Patent
Duquesne et al.

(10) Patent No.: US 11,807,775 B2
(45) Date of Patent: Nov. 7, 2023

(54) SILICONE-ORGANIC COPOLYMER, SEALANTS COMPRISING SAME, AND RELATED METHODS

(71) Applicants: Dow Silicones Corporation, Midland, MI (US); Dow Global Technologies LLC, Midland, MI (US)

(72) Inventors: Emmanuel Duquesne, Midland, MI (US); Michael S. Ferrito, Midland, MI (US); Martin Grasmann, Midland, MI (US); Brian Harkness, Midland, MI (US); William Johnson, Midland, MI (US); Bindu Krishnan, Midland, MI (US); Elizabeth Santos, Midland, MI (US); Justin Scherzer, Midland, MI (US); Jeanette Young, Midland, MI (US); Bizhong Zhu, Midland, MI (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 195 days.

(21) Appl. No.: 17/416,475

(22) PCT Filed: Dec. 16, 2019

(86) PCT No.: PCT/US2019/066560
§ 371 (c)(1),
(2) Date: Jun. 19, 2021

(87) PCT Pub. No.: WO2020/131708
PCT Pub. Date: Jun. 25, 2020

(65) Prior Publication Data
US 2022/0064482 A1    Mar. 3, 2022

Related U.S. Application Data

(60) Provisional application No. 62/783,712, filed on Dec. 21, 2018.

(51) Int. Cl.
| | | |
|---|---|---|
| *C09D 183/10* | (2006.01) | |
| *C08G 77/442* | (2006.01) | |
| *C08G 77/445* | (2006.01) | |
| *C08G 77/448* | (2006.01) | |
| *C08G 63/695* | (2006.01) | |
| *C08G 77/38* | (2006.01) | |
| *C08G 64/18* | (2006.01) | |
| *C08G 81/02* | (2006.01) | |

(52) U.S. Cl.
CPC ......... *C09D 183/10* (2013.01); *C08G 63/695* (2013.01); *C08G 64/186* (2013.01); *C08G 77/38* (2013.01); *C08G 77/442* (2013.01); *C08G 77/445* (2013.01); *C08G 77/448* (2013.01); *C08G 81/024* (2013.01)

(58) Field of Classification Search
CPC ..... C08G 64/186; C08G 64/42; C08G 65/336
See application file for complete search history.

(56) References Cited

U.S. PATENT DOCUMENTS

| | | | |
|---|---|---|---|
| 3,398,174 | A | 8/1968 | Barnes, Jr. |
| 3,419,635 | A * | 12/1968 | Vaughn, Jr. ............ C08G 77/42 528/29 |
| 3,592,795 | A | 7/1971 | Ashby |
| 3,971,751 | A | 7/1976 | Isayama et al. |
| 3,972,751 | A | 8/1976 | Engelhard |
| 4,207,071 | A | 6/1980 | Lipowitz et al. |
| 4,242,466 | A | 12/1980 | Schilling, Jr. |
| 4,283,519 | A | 8/1981 | Pines et al. |
| 4,323,488 | A | 4/1982 | Takago et al. |
| 4,345,053 | A | 8/1982 | Rizk et al. |
| 4,625,012 | A | 11/1986 | Rizk et al. |
| 4,772,675 | A | 9/1988 | Klosowski et al. |
| 4,960,844 | A | 10/1990 | Singh |
| 5,109,064 | A | 4/1992 | Wakabayashi et al. |
| 5,130,413 | A | 7/1992 | Asai et al. |
| 5,403,881 | A | 4/1995 | Okawa et al. |
| 5,457,166 | A | 10/1995 | Yoshikawa et al. |
| 5,552,223 | A | 9/1996 | Mikami et al. |
| 5,569,691 | A | 10/1996 | Guggenberger et al. |
| 5,623,044 | A | 4/1997 | Chiao |
| 5,811,566 | A | 9/1998 | Watabe et al. |
| 5,840,800 | A | 11/1998 | Joffre et al. |
| 5,852,137 | A | 12/1998 | Hsieh et al. |
| 6,132,664 | A | 10/2000 | Gutek et al. |
| 6,204,350 | B1 | 3/2001 | Liu et al. |
| 6,235,832 | B1 | 5/2001 | Deng et al. |
| 6,258,878 | B1 | 7/2001 | Bahadur et al. |
| 6,265,518 | B1 | 7/2001 | Krahnke et al. |
| 6,395,341 | B1 | 5/2002 | Arakawa et al. |

(Continued)

FOREIGN PATENT DOCUMENTS

| | | |
|---|---|---|
| CN | 1096039 A | 12/1994 |
| CN | 101151329 A | 3/2008 |

(Continued)

OTHER PUBLICATIONS

Machine translation of JP 2006-328416 in English (no date).*

(Continued)

*Primary Examiner* — Marc S Zimmer
(74) *Attorney, Agent, or Firm* — WARNER NORCROSS + JUDD LLP

(57) ABSTRACT

A silicone-organic copolymer has the formula $X_g[Z_jY_o]_c$, where each X is an independently selected silicone moiety having a particular structure, each Y is an independently selected polyacrylate moiety, each Z is an independently selected siloxane moiety, subscript c is from 1 to 150, subscript g is >1, 0<j<2, and 0<o<2, with the proviso that j+o=2 in each moiety indicated by subscript c. Methods of preparing the silicone-organic copolymer are also disclosed. Further, a sealant is disclosed, the sealant comprising the silicone-organic copolymer and a condensation-reaction catalyst.

16 Claims, No Drawings

(56) References Cited

U.S. PATENT DOCUMENTS

| | | |
|---|---|---|
| 6,437,071 B1 | 8/2002 | Odaka et al. |
| 6,503,995 B2 | 1/2003 | Tsuji et al. |
| 6,541,593 B1 | 4/2003 | Jyono et al. |
| 7,223,817 B2 | 5/2007 | Nakagawa et al. |
| 7,279,589 B2 | 10/2007 | Uehara et al. |
| 7,345,130 B2 | 3/2008 | Zhu et al. |
| 7,601,428 B2 | 10/2009 | Yamane et al. |
| 7,625,990 B2 | 12/2009 | Wakabayashi et al. |
| 7,763,699 B2 | 7/2010 | Odaka et al. |
| 7,794,843 B2 | 9/2010 | Yamane et al. |
| 7,829,649 B2 | 11/2010 | Yamane et al. |
| 7,893,170 B2 | 2/2011 | Wakioka et al. |
| 7,960,459 B2 | 6/2011 | Noro et al. |
| 7,973,108 B2 | 7/2011 | Okamoto et al. |
| 7,994,262 B2 | 8/2011 | Kono |
| 8,030,427 B2 | 10/2011 | Wakabayashi et al. |
| 8,084,552 B2 | 12/2011 | Herzig |
| 8,158,723 B2 | 4/2012 | Lucet et al. |
| 8,178,645 B2 | 5/2012 | Popa et al. |
| 8,450,514 B2 | 5/2013 | Schubert et al. |
| 8,481,640 B2 | 7/2013 | Gough et al. |
| 8,592,545 B2 | 11/2013 | Mackinnon et al. |
| 8,697,815 B2 | 4/2014 | Rutz et al. |
| 8,822,626 B2 | 9/2014 | Vyakaranam et al. |
| 8,877,885 B2 | 11/2014 | Vyakaranam et al. |
| 9,428,617 B2 | 8/2016 | Mittal et al. |
| 9,598,578 B1 | 3/2017 | Groote et al. |
| 9,617,390 B2 | 4/2017 | Hinzmann et al. |
| 10,358,526 B2 | 7/2019 | Müller et al. |
| 2002/0010245 A1 | 1/2002 | Enami et al. |
| 2002/0013427 A1 | 1/2002 | Tsuji et al. |
| 2002/0084030 A1 | 7/2002 | Kotani et al. |
| 2003/0027974 A1 | 2/2003 | Tamai et al. |
| 2004/0138398 A1 | 7/2004 | Fujimoto et al. |
| 2005/0107547 A1 | 5/2005 | Ohno et al. |
| 2005/0222332 A1 | 10/2005 | Nakagawa et al. |
| 2006/0128919 A1 | 6/2006 | Okamoto et al. |
| 2006/0293480 A1 | 12/2006 | Landon et al. |
| 2007/0037997 A1 | 2/2007 | Uehara |
| 2007/0093628 A1 | 4/2007 | Zhu et al. |
| 2007/0116907 A1 | 5/2007 | Landon et al. |
| 2007/0173620 A1 | 7/2007 | Kono |
| 2007/0219299 A1 | 9/2007 | Okamoto et al. |
| 2007/0290202 A1 | 12/2007 | Matsumoto et al. |
| 2008/0051547 A1 | 2/2008 | Wakabayashi et al. |
| 2008/0071042 A1 | 3/2008 | Yamane et al. |
| 2009/0182091 A1 | 7/2009 | Noro et al. |
| 2010/0041910 A1 | 2/2010 | Schubert et al. |
| 2010/0168309 A1 | 7/2010 | Mackinnon et al. |
| 2010/0216925 A1 | 8/2010 | Yano |
| 2010/0234518 A1 | 9/2010 | Ferrito et al. |
| 2011/0040036 A1 | 2/2011 | Herzig |
| 2011/0245144 A1 | 10/2011 | Messner et al. |
| 2012/0135241 A1 | 5/2012 | Yasuda et al. |
| 2012/0214925 A1 | 8/2012 | Gubbels et al. |
| 2012/0228864 A1 | 11/2012 | Gallucci et al. |
| 2013/0060000 A1 | 3/2013 | Zhang et al. |
| 2013/0096252 A1 | 4/2013 | Vyakaranam et al. |
| 2013/0096274 A1 | 4/2013 | Vyakaranam et al. |
| 2014/0010853 A1 | 1/2014 | Williams et al. |
| 2014/0018485 A1 | 1/2014 | Cook et al. |
| 2014/0024774 A1 | 1/2014 | Cook et al. |
| 2014/0127140 A1 | 5/2014 | Ferrito et al. |
| 2014/0128539 A1 | 5/2014 | Liu |
| 2014/0249280 A1 | 9/2014 | Kim et al. |
| 2014/0256888 A1 | 9/2014 | Ishikawa et al. |
| 2014/0302318 A1 | 10/2014 | Ferrito et al. |
| 2015/0087773 A1 | 3/2015 | Williams et al. |
| 2015/0166733 A1 | 6/2015 | Nagao et al. |
| 2015/0183951 A1 | 7/2015 | Bhagwagar et al. |
| 2015/0259581 A1 | 9/2015 | Miyafuji |
| 2015/0353741 A1 | 12/2015 | Liao |
| 2016/0122478 A1 | 5/2016 | Ferrito et al. |
| 2016/0130402 A1 | 5/2016 | Schubert et al. |
| 2016/0168175 A1 | 6/2016 | Haaf-Kleinhubbert et al. |
| 2016/0222169 A1 | 8/2016 | Hinzmann et al. |
| 2017/0107374 A1 | 4/2017 | Harumashi et al. |
| 2017/0130096 A1 | 5/2017 | Grunlan et al. |
| 2017/0306096 A1 | 10/2017 | Muthusamy et al. |
| 2017/0313816 A1 | 11/2017 | Muller et al. |
| 2017/0369648 A1 | 12/2017 | Willumstad et al. |
| 2018/0002491 A1 | 1/2018 | Peeters |
| 2020/0262966 A1* | 8/2020 | Suen .................. C08G 18/4009 |
| 2021/0309792 A1* | 10/2021 | Stanjek .................. C09J 175/08 |

FOREIGN PATENT DOCUMENTS

| | | | |
|---|---|---|---|
| CN | 101959938 A | | 1/2011 |
| CN | 102473056 A | | 5/2012 |
| CN | 103534297 A | | 1/2014 |
| CN | 103930466 A | | 7/2014 |
| CN | 103958573 A | | 7/2014 |
| CN | 104395373 A | | 3/2015 |
| CN | 104471012 A | | 3/2015 |
| CN | 107075063 A | | 8/2017 |
| CN | 108350263 A | | 7/2018 |
| EP | 0265929 A2 | | 5/1988 |
| EP | 0352339 A1 | | 1/1990 |
| EP | 0415404 A2 | | 3/1991 |
| EP | 0693513 A2 | | 1/1996 |
| EP | 598263 B1 * | | 6/1998 |
| EP | 1153942 A1 | | 11/2001 |
| EP | 1746133 A1 | | 1/2007 |
| JP | S45027718 B | | 9/1970 |
| JP | S53139695 A | | 12/1978 |
| JP | S57158226 A | | 9/1982 |
| JP | H03140316 A | | 6/1991 |
| JP | H04202317 A | | 7/1992 |
| JP | H06145359 A | | 5/1994 |
| JP | H06166810 A | | 6/1994 |
| JP | H06211922 A | | 8/1994 |
| JP | H0753723 A | | 2/1995 |
| JP | H0912709 A | | 1/1997 |
| JP | H11172003 A | | 6/1999 |
| JP | H11255883 A | | 9/1999 |
| JP | H11279274 A | | 10/1999 |
| JP | 2000327771 A | | 11/2000 |
| JP | 2001049113 A | | 2/2001 |
| JP | 2002226564 A | | 8/2002 |
| JP | 2002533518 A | | 10/2002 |
| JP | 2002356613 A | | 12/2002 |
| JP | 2004123893 A | | 4/2004 |
| JP | 2005306891 A | | 11/2005 |
| JP | 2006328416 A | | 12/2006 |
| JP | 2007091929 A | | 4/2007 |
| JP | 2007091930 A | | 4/2007 |
| JP | 2008088412 A | | 4/2008 |
| JP | 20071974285 A | | 10/2012 |
| JP | 2013508493 A | | 3/2013 |
| JP | 2013532226 A | | 8/2013 |
| JP | 2016530357 A | | 9/2016 |
| WO | 2002094938 A2 | | 11/2002 |
| WO | 2004108774 A1 | | 12/2004 |
| WO | 2007075927 A1 | | 7/2007 |
| WO | 2012119940 A1 | | 9/2012 |
| WO | 2012148635 A2 | | 11/2012 |
| WO | 2013003051 A2 | | 1/2013 |
| WO | 2014038656 A1 | | 3/2014 |
| WO | 2014106610 A1 | | 7/2014 |
| WO | 2014112321 A1 | | 7/2014 |
| WO | 2014126599 A1 | | 8/2014 |
| WO | 2015003875 A1 | | 1/2015 |
| WO | 2015023372 A1 | | 2/2015 |
| WO | 2016002907 A1 | | 1/2016 |
| WO | 2016046110 A1 | | 3/2016 |
| WO | 2016114376 A1 | | 7/2016 |
| WO | WO 2020/035154 A1 * | | 2/2020 |

OTHER PUBLICATIONS

Machine assisted English translation of JPS53139695, obtained from espacenet.com on Sep. 23, 2021, 9 pages.

(56) References Cited

OTHER PUBLICATIONS

Machine assisted English translation of JPH03140316, obtained from espacenet.com on Sep. 23, 2021, 6 pages.
Machine assisted English translation of JP2002226564, obtained from espacenet.com on Sep. 23, 2021, 12 pages.
Machine assisted English translation of JP2004123893, obtained from espacenet.com on Sep. 23, 2021, 11 pages.
Machine assisted English translation of WO2004108774, obtained from patents.google.com on Sep. 23, 2021, 27 pages.
Machine assisted English translation of JPS57158226A obtained from https://worldwide.espacenet.com/patent on Jun. 7, 2022, 4 pages.
Machine assisted English translation of JPH0912709A obtained from https://worldwide.espacenet.com/patent on Jun. 7, 2022, 8 pages.
Machine assisted English translation of JPH11172003A obtained from https://patents.google.com/patent on Dec. 14, 2021, 27 pages.
Machine assisted English translation of JP2006328416A obtained from https://patents.google.com/patent on Dec. 14, 2021, 20 pages.
Machine assisted English translation of JPH0753723A obtained from https://patents.google.com/patent on Dec. 14, 2021, 8 pages.
Machine assisted English translation of JPH04202317A obtained from https://worldwide.espacenet.com/patent on Del. 14, 2021, 5 pages.
Machine assisted English translation of CN101151329A, obtained from https://patents.google.com/ on Feb. 2, 2022, 20 pages.
International Search Report for PCT/US2019/066560 dated Aug. 12, 2020, 8 pages.
Machine assisted English translation of JPH11255883A obtained from https://patents.google.com/patent on Sep. 20, 2021, 12 pages.
Machine assisted English translation of JPH11279274A obtained from https://patents.google.com/patent on Sep. 20, 2021, 26 pages.
Machine assisted English translation of JP2007091930A obtained from https://patents.google.com/patent on Sep. 20, 2021, 16 pages.
Machine assisted English translation of WO2014112321A1 obtained from https://patents.google.com/patent on Sep. 20, 2021, 12 pages.
Machine assisted English translation of JPH06211922A obtained from https://patents.google.com/patent on Feb. 21, 2023, 19 pages.
Machine assisted English translation of JP2000327771A obtained from https://patents.google.com/patent on May 7, 2023, 9 pages.
Machine assisted English translation of JP2007091929A obtained from https://worldwide.espacenet.com/ on May 4, 2023, 26 pages.

* cited by examiner

SILICONE-ORGANIC COPOLYMER, SEALANTS COMPRISING SAME, AND RELATED METHODS

CROSS-REFERENCE TO RELATED APPLICATIONS

This application is the National Stage of International Appl. No. PCT/US2019/066560 filed on 16 Dec. 2019, which claims priority to and all advantages of U.S. Provisional Patent Application No. 62/783,712 filed on 21 Dec. 2018, the content of which is incorporated herein by reference.

FIELD OF THE INVENTION

The present invention generally relates to copolymers and, more specifically, to a silicone-organic copolymer, methods of preparing the same, and sealants comprising the same.

DESCRIPTION OF THE RELATED ART

Sealants are known in the art and are utilized in myriad end use applications and environments. Physical and performance properties of sealants, as well as the particular curing mechanism associated therewith, are generally selected based on the particular end use application and environment in which the sealants are utilized. Sealants can be based on a variety of different chemistries and cure mechanisms. For example, sealants can be silicone-based and include organopolysiloxanes. Alternatively, sealants can be organic and include organic components, e.g. to form urethanes. Increasingly, hybrid materials are utilized in sealants, which can combine the benefits traditionally associated with silicone-based sealants and organic sealants.

BRIEF SUMMARY OF THE INVENTION

A silicone-organic copolymer having the formula $X_g[Z_jY_o]_c$ is disclosed. Each Y comprises an independently selected organic moiety selected from polycarbonate moieties, polyester moieties, and polyacrylate moieties. Each X is independently a silicone moiety having formula $-D^1-SiR^1_a(OR)_{3-a}$; where each $D^1$ is an independently selected divalent group; each $R^1$ is an independently selected substituted or unsubstituted hydrocarbyl group having from 1 to 18 carbon atoms; each R is an independently selected alkyl group having from 1 to 10 carbon atoms; and each subscript a is independently selected from 0 to 2. Each Z is an independently selected siloxane moiety having the formula $[R^1_hSiO_{(4-h)/2}]_d$; where each $R^1$ is defined above; each subscript d is from 1 to 1000; and each subscript h is independently selected from 0 to 2 in each moiety indicated by subscript d. Each subscript j is independently >0 and <2, each subscript o is independently >0 and <2, with the proviso that j+o=2 in each moiety indicated by subscript c; subscript c is from 1 to 150; and subscript g is >1.

A method of preparing the silicone-organic copolymer is disclosed. The method comprises reacting an organic compound having on average more than one unsaturated group, a chain extending organosilicon compound having on average more than one silicon-bonded hydrogen atom, and an endcapping organosilicon compound, in the presence of a hydrosilylation catalyst, to give the silicone-organic copolymer.

A second method of preparing the silicone-organic copolymer is further disclosed. This second method comprises reacting an organic compound having one terminal unsaturated group and one terminal hydroxyl group with an endcapping organosilicon compound in the presence of a hydrosilylation catalyst to give a hydroxyl-functional intermediate. This second method further comprises reacting the hydroxyl-functional intermediate with a polyisocyanate to give an isocyanate-functional intermediate, and reacting the isocyanate-functional intermediate and a polyacrylate compound having on average more than one hydroxyl group to give the silicone-organic copolymer.

A third method of preparing the silicone-organic copolymer is additionally disclosed. This third method comprises reacting an organic compound having on average more than one hydroxyl group, a chain extending organosilicon compound having on average more than one hydroxyl group, a polyisocyanate compound, and an endcapping organosilicon compound having an isocyanate functional group, to give the silicone-organic copolymer.

A sealant is also disclosed. The sealant comprises a condensation reaction catalyst and further comprises the silicone-organic copolymer.

A cured product is additionally disclosed. The cured product is formed from the sealant. Further, a composite article and a method of preparing the composite article are disclosed. The composite article comprises a substrate and the cured product disposed on the substrate. The method comprising disposing the sealant on the substrate, and curing the sealant to give the cured product on the substrate, thereby preparing the composite article.

DETAILED DESCRIPTION OF THE INVENTION

A silicone-organic copolymer has the formula $X_g[Z_jY_o]_c$. Each Y comprises an independently selected organic moiety selected from polycarbonate moieties, polyester moieties, and polyacrylate moieties. Each X is independently a silicone moiety having formula $-D^1-SiR^1_a(OR)_{3-a}$; where each $D^1$ is an independently selected divalent group; each $R^1$ is an independently selected substituted or unsubstituted hydrocarbyl group having from 1 to 18 carbon atoms; each R is an independently selected alkyl group having from 1 to 10 carbon atoms; and each subscript a is independently selected from 0 to 2. Each Z is an independently selected siloxane moiety having the formula $[R^1_hSiO_{(4-h)/2}]_d$; where each $R^1$ is defined above; each subscript d is from 1 to 1000; and each subscript h is independently selected from 0 to 2 in each moiety indicated by subscript d. Each subscript j is independently >0 and <2, each subscript o is independently >0 and <2, with the proviso that j+o=2 in each moiety indicated by subscript c; subscript c is from 1 to 150; and subscript g is >1.

Each $R^1$ is independently selected and may be linear, branched, cyclic, or combinations thereof. Cyclic hydrocarbyl groups encompass aryl groups as well as saturated or non-conjugated cyclic groups. Cyclic hydrocarbyl groups may be monocyclic or polycyclic. Linear and branched hydrocarbyl groups may independently be saturated or unsaturated. One example of a combination of a linear and cyclic hydrocarbyl group is an aralkyl group. By "substituted," it is meant that one or more hydrogen atoms may be replaced with atoms other than hydrogen (e.g. a halogen atom, such as chlorine, fluorine, bromine, etc.), or a carbon atom within the chain of $R^1$ may be replaced with an atom other than carbon, i.e., $R^1$ may include one or more heteroatoms within the chain, such as oxygen, sulfur, nitrogen, etc. Suitable alkyl groups are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, as well as branched saturated hydrocarbon groups of 6 carbon atoms. Suitable aryl groups are exemplified by, but not limited to, phenyl, tolyl, xylyl, naphthyl, benzyl, and dimethyl phenyl. Suitable alkenyl groups include vinyl, allyl, propenyl, isopropenyl, butenyl, isobutenyl, pentenyl, heptenyl, hexenyl, and cyclohexenyl groups. Suitable monovalent halogenated hydrocarbon groups include, but are not limited to, a halogenated alkyl group of 1 to 6 carbon atoms, or a halogenated aryl group of 6 to 10 carbon atoms. Suitable halogenated alkyl groups are exemplified by, but not limited to, the alkyl groups described above where one or more hydrogen atoms is replaced with a halogen atom, such as F or Cl. For example, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl are examples of suitable halogenated alkyl groups. Suitable halogenated aryl groups are exemplified by, but not limited to, the aryl groups described above where one or more hydrogen atoms is replaced with a halogen atom, such as F or Cl. For example, chlorobenzyl and fluorobenzyl are suitable halogenated aryl groups.

In certain embodiments, each $R^1$ is an independently selected alkyl group. In specific embodiments, $R^1$ has from 1 to 4, alternatively from 1 to 3, alternatively from 1 to 2, alternatively 1, carbon atom(s).

Each R is an independently selected alkyl group having from 1 to 10, alternatively from 1 to 9, alternatively from 1 to 8, alternatively from 1 to 7, alternatively from 1 to 6, alternatively from 1 to 5, alternatively from 1 to 4, alternatively from 1 to 3, alternatively from 1 to 2, alternatively 1, carbon atom(s). R can be linear or branched. Typically, R is linear.

As introduced above, each X is independently a silicone moiety having formula $-D^1-SiR^1{}_a(OR)_{3-a}$. Each subscript a is independently selected from 0 to 2, alternatively from 0 or 1, alternatively is 0.

With regard to the silicone-organic copolymer, it is to be understood that the sub-formula $[Z_jY_o]_c$ is not intended to imply a linear structure of the copolymer moieties indicated by ZY. Rather, as understood in the art, the copolymer moieties indicated by ZY may be linear or branched, with each moiety indicated by subscript c being independently selected. As such, the silicone-organic copolymer comprises c number of copolymer moieties ZY, which each comprise o number of organic moieties Y and j number of siloxane moieties Z. Additionally, as will be understood in view of the description below, each organic moiety Y and siloxane moiety Z are independently selected, both within each moiety indicated by subscript c and between such moieties, and also may each be linear or branched.

Each subscript c is from 1 to 150, such as from 1 to 100, alternatively from 1 to 50, alternatively from 1 to 25, alternatively from 1 to 10, and alternatively from 1 to 5. Subscript g is greater than 1, such as from 1.1 to 10, alternatively from 1.1 to 8, alternatively from 1.1 to 6, alternatively from 1.1 to 4, alternatively from 1.1 to 3, alternatively from 1.1 to 2, alternatively from 1.1 to 1.9, alternatively from 1.2 to 1.8, alternatively from 1.2 to 1.7, alternatively from 1.3 to 1.7, alternatively from 1.4 to 1.7, alternatively of about 1.4, 1.5, 1.6, or 1.7.

Each subscript j is >0 and <2, and each subscript o is >0 and <2, with the proviso that j+o=2 in each moiety indicated by subscript c. As such, subscripts j and o may be considered mole fractions, e.g. where j=1 and o=1 equating to a 0.5:0.5 molar ratio of siloxane moiety Z to organic moiety Y in a moiety indicated by subscript c. For example, when subscript j is >0, the molar ratio of Z:Y may be independently from about 1000:1 to about 1:1000, alternatively from about 100:1 to about 1:100, alternatively from about 10:1 to about 1:10, alternatively from about 5:1 to about 1:5, alternatively from about 2:1 to about 1:2, in each moiety indicated by subscript c. When j is 0, the silicone-organic copolymer need not require two distinct organic moieties indicated by subscript o, despite c being 2. The designation of subscripts j and o is merely for mole fraction purposes of the copolymer moieties indicated by ZY.

As described above, the sub-formula $[Z_jY_o]_c$ is not intended to imply a linear structure of the copolymer moieties indicated by ZY. Likewise, the sub-formula does not require a particular structure of any of the copolymer moieties ZY. Rather, depending on the values selected for subscripts j and o, the copolymer moiety indicated by sub-formula $[Z_jY_o]_c$ may comprise siloxane moieties Z and organic moieties Y in block form (e.g. Z-Y, Y-Z, Y-Z-Y, Z-Y-Z-Y, YY-ZZ, etc.) or random form with subscript j is greater than 0. In particular embodiments, the silicone-organic copolymer comprises organic moieties Y and siloxane moieties Z in a 2:1 ratio. In some such embodiments, the organic moieties Y and siloxane moieties Z are present in the silicone-organic copolymer in block form, such that the silicone-organic copolymer has the formula $X_gY[ZY]_c$, where subscripts c and g are defined above. In some of these embodiments, the silicone-organic copolymer comprises linear organic moieties Y and linear siloxane moieties Z, and is endcapped by silicone moieties X, such that the silicone-organic copolymer has the formula $X_{g'}Y[ZY]_cX_{g''}$, where c is defined above, and each of g' and g" is >0, with the proviso that g'+g" is >1.

With regard to each X generally, each subscript a is independently from 0 to 2, alternatively from 0 to 1. Typically, subscript a is 0. In some embodiments, each subscript a is 0. In certain embodiments, the silicone-organic copolymer comprises at least one X where subscript a is 1.

Each $D^1$ is an independently selected divalent group. In certain embodiments, $D^1$ is an independently selected divalent hydrocarbon group. $D^1$ may include heteroatoms, e.g. D1 may include at least one ether moiety. $D^1$ may be substituted or unsubstituted. In certain embodiments, $D^1$ has from 2 to 18 carbon atoms, alternatively from 2 to 16 carbon atoms, alternatively from 2 to 14 carbon atoms, alternatively from 2 to 12 carbon atoms, alternatively from 2 to 10 carbon atoms, alternatively from 2 to 8 carbon atoms, alternatively from 2 to 6 carbon atoms, alternatively from 2 to 4 carbon atoms, alternatively 2 or 3 carbon atoms, alternatively 2 carbon atoms. Each $D^1$ may independently be linear or branched. For example, when $D^1$ has two carbon atoms, $D^1$ may have formula $-C_2H_4-$, and may be linear $-(CH_2CH_2)-$ or branched $-(CHCH_3)-$. Alternatively, when $D^1$ has two carbon atoms, $D^1$ may have formula $CH_2OCH_2-$. In certain embodiments, $D^1$ is linear. When the silicone-organic copolymer is prepared in bulk, in certain embodiments, at least 90 mol % of $D^1$ are linear. In specific embodiments, each $D^1$ is $C_2H_4$.

Each Y is an organic moiety selected from polycarbonate moieties, polyester moieties, and polyacrylate moieties.

When Y comprises a polycarbonate moiety, Y can comprise any polycarbonate moiety including at least one, alternatively at least two, carbonate moieties. When Y comprises a polyester moiety, Y can comprise any polyester moiety including at least one, alternatively at least two, ester moieties. When Y comprises a polyacrylate moiety, Y can comprise any polyacrylate moiety including at least one, alternatively at least two, acrylate moieties. Each Y may be the same as any or each other Y. Alternatively, the silicone-organic copolymer may comprise at least two Y that are different from each other. Y can be linear or branched. Y may be divalent, trivalent, tetravalent, or have a valency greater than 4. Valency, in the context of the organic moiety Y, refers to the number of Y-X bonds present in the silicone-organic copolymer.

In certain embodiments, at least one Y comprises a polycarbonate moiety. The polycarbonate moiety is not limited and may be formed from any polycarbonate compound, as described below in regards to the method of preparing the silicone-organic copolymer. The term "polycarbonate moiety," as used herein, means a moiety including at least one carbonate bond. For example, the polycarbonate moiety may be monomeric, oligomeric, polymeric, aliphatic, aromatic, araliphatic, etc. In addition, the silicone-polycarbonate copolymer may comprise a different polycarbonate moieties, which are independently selected.

Methods of preparing polycarbonates (and polycarbonate moieties) are known in the art. For example, polycarbonates may be prepared via conventional processes, such as those utilizing a hydroxyl compound (e.g. an aromatic and/or aliphatic alcohol or glycol) in an alkoxylation of phosgene (i.e., $COCl_2$), conversion of the hydroxyl compound to alkali metal alkoxide or aryloxide and reaction with phosgene, a transalkoxylation of a carbonate monomer, an alkoxylation and/or transalkoxylation of an alkyl chloroformate (e.g. methyl chloroformate), ring opening polymerization of cyclic carbonates, or combinations thereof. The hydroxyl compound is typically a polyhydric alcohol.

Specific examples of hydroxyl compounds suitable for preparing polycarbonates (and polycarbonate moieties) include ethylene glycol, diethylene glycol, propylene glycol, dipropylene glycol, trimethylene glycol, 1,3-propanediol, 1,2-butane diol, 1,3-butanediol, 1,4-butanediol, 1,2-pentanediol, 1,4-pentanediol, neopentyl glycol, 1,5-pentanediol, 1,6-hexanediol, 1,7-heptanediol, glycerol, 1,1,1-trimethylolpropane, 1,1,1-trimethylolethane, 1,2,6-hexanetriol, decanediol, dodecanediol α-methyl glucoside, pentaerythritol, and sorbitol. Also included within the term "polyhydric alcohols" are compounds derived from phenol such as 2,2-bis(4-hydroxylphenyl)propane, commonly known as Bisphenol A.

Examples of carbonate monomers suitable for preparing polycarbonates (and polycarbonate moieties) include acyclic carbonate esters, such as dialkyl carbonates (e.g. dimethyl carbonate), diaryl carbonates (e.g. diphenyl carbonate), and cyclic carbonate esters such as ethylene carbonate, trimethylene carbonate, etc. Other carbonate monomers may also be utilized, such as those prepared via conventional processes, including those utilizing a hydroxyl compound (e.g. such as those described herein) in a bisalkoxylation of phosgene or in an oxidative carbonylation (e.g. reaction with carbon monoxide and an oxidizer). In such processes, the hydroxyl compound may be a monohydric alcohol, such as an alkyl alcohol (e.g. methanol, ethanol, propanol, etc.), a phenol, etc.

Other methods of preparing polycarbonates (and polycarbonate moieties) are also known. For example, polycarbonates (and polycarbonate moieties) may comprise ring-opened polymers of an oxirane (e.g. an epoxide compound, such as propylene oxide) and $CO_2$.

It will be appreciated that polycarbonates (and polycarbonate moieties) prepared as described above may be mono- or polyfunctional with respect to the functional groups present therein (e.g. in the terminal position(s)), which are typically selected by one of skill in the art, e.g. via the particular method of preparation utilized, the order of addition and/or relative amounts of the compounds used to form the polycarbonates (and polycarbonate moieties), etc. For example, such methods may be utilized to prepare polycarbonate diols and/or polycarbonate polyols, e.g. via utilizing the methods of oxidative oxirane carbonylation and/or the alkoxylation and/or transalkoxylation of the carbonate monomer and/or carbonyl chloride monomer with one or more of the polyhydric alcohols described above. It is also to be appreciated that combinations of the hydroxyl compounds may also be utilized in any one particular method of preparation, such that the polycarbonates (and polycarbonate moieties) may be homopolymeric or copolymeric with respect to any repeating segments therein.

In certain embodiments, at least one Y comprises a polyester moiety. The polyester moiety is not limited and may be formed from any polyester compound, as described below in regards to the method of preparing the silicone-organic copolymer. The term "polyester moiety," as used herein, means a moiety including at least one ester bond. For example, the polyester moiety may be monomeric, oligomeric, polymeric, aliphatic, aromatic, araliphatic, etc. In addition, the silicone-polyester copolymer may comprise a different polyester moieties, which are independently selected.

Methods of preparing polyesters (and polyester moieties) are known in the art. For example, polyesters may be prepared via a conventional esterification process using a hydroxyl compound (e.g. an aromatic and/or aliphatic alcohol or glycol) and an acid. The hydroxyl compound is typically a polyhydric alcohol.

Specific examples of hydroxyl compounds suitable for preparing polyesters (and polyester moieties) include ethylene glycol, diethylene glycol, propylene glycol, dipropylene glycol, trimethylene glycol, 1,3-propanediol, 1,2-butane diol, 1,3-butanediol, 1,4-butanediol, 1,2-pentanediol, 1,4-pentanediol, neopentyl glycol, 1,5-pentanediol, 1,6-hexanediol, 1,7-heptanediol, glycerol, 1,1,1-trimethylolpropane, 1,1,1-trimethylolethane, 1,2,6-hexanetriol, decanediol, dodecanediol α-methyl glucoside, pentaerythritol, and sorbitol. Also included within the term "polyhydric alcohols" are compounds derived from phenol such as 2,2-bis(4-hydroxylphenyl)propane, commonly known as Bisphenol A.

Specific examples of acids suitable for preparing polyesters (and polyester moieties) include polycarboxylic acids, including oxalic acid, malonic acid, succinic acid, glutaric acid, adipic acid, 2-methyl-1,6-hexanoic acid, pimelic acid, suberic acid, azelaic acid, sebacic acid, brassylic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, phthalic acid, isophthalic acid and 1,4-cyclohexanedicarboxylic acid.

Other methods of preparing polyesters (and polyester moieties) are also known. For example, polyesters (and polyester moieties) may comprise ring-opened polymers of a cyclic lactone, polycondensation products of a hydroxycarboxylic acid, and polycondensation products of a dibasic acid and a polyol, and transesterification of an ester compound with a hydroxyl compound or another ester compound.

In certain embodiments, at least one Y comprises a polyacrylate moiety. The polyacrylate moiety is not limited and may be formed from any polyacrylate compound, as described below in regards to the method of preparing the silicone-organic copolymer. The term "polyacrylate moiety," as used herein, means a moiety including at least one acrylate functional group (e.g. an alkyl acrylate group such as a methyl, ethyl, or butyl acrylate group, a substituted acrylate group such as a 2-ethylhexyl or hydroxyl ethyl group, and others such as a methylolpropane acrylate group). As will be understood in view of the description herein, the polyacrylate moiety may be monomeric, oligomeric, polymeric, aliphatic, aromatic, araliphatic, etc. In addition, the silicone-organic copolymer may comprise a different polyacrylate moieties, which are independently selected.

Methods of preparing polyacrylates (and polyacrylate moieties) are known in the art. For example, polyacrylates may be prepared via a conventional radical polymerization of acrylic monomers. Such conventional methods are generally carried out by combining radically-polymerizable monomers (e.g. acrylate monomers, comonomers, etc.) in the presence of a radical initiator/generator, such as a thermo-, chemo, and/or photopolymerization initiator. For example, peroxides and aromatic initiators (e.g. phenols, benzoins, heterocycles such as imidazoles, etc.) are commonly utilized. These conventional methods may be used to prepare acrylate homopolymers and copolymers, including ternary, quaternary, and higher-order copolymers. Acrylic monomers bearing other functional groups can be copolymerized to introduce these functional groups onto the polyacrylate chain. These monomers include, for example, hydroxyl functional monomers. These functionalities can also be converted after polymerization into functional groups desirable for certain end use applications. For example, an anhydride group can be readily transformed to an acid by hydrolysis, or a hydroxyl by reacting with a polyhydric hydroxyl compound. Unsaturation of different reactivity towards initiated polymerization can be used to introduce side functional unsaturated groups such as allyl, for example. Various controlled free radical polymerization techniques can be utilized to prepare more defined polyacrylate structures bearing functional groups at the more exact locations desired. These techniques include, but are not limited to, the techniques of reversible-deactivation polymerization, catalytic chain transfer and cobalt mediated radical polymerization, iniferter polymerization, stable free radical mediated polymerization, atom transfer radical polymerization (ATRP), reversible addition fragmentation chain transfer polymerization (RAFT), iodine-transfer polymerization (ITP), selenium-centered radical mediated polymerization, telluride mediated polymerization (TERP), stibine-mediated polymerization, nitroxide-mediated polymerization, etc. Different acrylate monomers can be copolymerized to have a block or more random structure. Monomers other than acrylic monomers, such as styrene, can also be copolymerized. Functional groups can be introduced by end capping the living ends of the polymer at the end of the polymerization. Block copolymers can also be prepared by way of using macro-initiators. Polyacrylates and copolymers can also be prepared by anionic or cationic polymerization techniques. Additionally, di- and/or multi-functional acrylic monomers may also be utilized, e.g. to prepare multifunctional polyacrylates (and polyacrylate moieties), as will be understood in view of the description of suitable acrylic monomers herein.

In general, methods of preparing polyacrylates (and polyacrylate moieties) utilize at least one acrylic monomer having an acryloyloxy or alkylacryloyloxy group (i.e., acrylates, alkylacrylates, acrylic acids, alkylacrylic acids, and the like, as well as derivatives and/or combinations thereof). Such acrylic monomers may be monofunctional or polyfunctional acrylic monomers.

Examples of specific monofunctional acrylic monomers suitable for preparing polyacrylates (and polyacrylate moieties) include (alkyl)acrylic compounds, such as methyl acrylate, phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl)-2-hydroxypropyl (meth)acrylate, polyoxyethylene-modified p-cumylphenol (meth)acrylate, 2-bromophenoxyethyl (meth)acrylate, 2,4-dibromophenoxyethyl (meth)acrylate, 2,4,6-tribromophenoxyethyl (meth)acrylate, polyoxyethylene-modified phenoxy (meth)acrylate, polyoxypropylene-modified phenoxy (meth)acrylate, polyoxyethylene nonylphenyl ether (meth)acrylate, isobornyl (meth)acrylate, 1-adamantyl (meth)acrylate, 2-methyl-2-adamantyl (meth)acrylate, 2-ethyl-2-adamantyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, benzyl (meth)acrylate, 1-naphthylmethyl (meth)acrylate, 2-naphthylmethyl (meth)acrylate, tetrahydrofurfuryl (meth)acrylate, butoxyethyl (meth)acrylate, ethoxydiethylene glycol (meth)acrylate, poly(ethylene glycol) mono(meth)acrylate, poly(propylene glycol) mono (meth)acrylate, methoxyethylene glycol (meth)acrylate, ethoxyethyl (meth)acrylate, methoxypoly(ethylene glycol) (meth)acrylate, methoxypoly(propylene glycol) (meth)acrylate, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, and the like, as well as derivatives thereof.

Examples of specific polyfunctional acrylic monomers suitable for preparing polyacrylates (and polyacrylate moieties) include (alkyl)acrylic compounds having two or more acryloyl or methacryloyl groups, such as trimethylolpropane di(meth)acrylate, trimethylolpropane tri(meth)acrylate, polyoxyethylene-modified trimethylolpropane tri(meth)acrylate, polyoxypropylene-modified trimethylolpropane tri(meth)acrylate, polyoxyethylene/polyoxypropylene-modified trimethylolpropane tri(meth)acrylate, dimethyloltricyclodecane di(meth)acrylate, pentaerythritol tri(meth)acrylate, pentaerythritol tetra(meth)acrylate, ethylene glycol di(meth)acrylate, tetraethylene glycol di(meth)

acrylate, phenylethylene glycol di(meth)acrylate, poly(ethylene glycol) di(meth)acrylate, poly(propylene glycol) di(meth)acrylate, 1,4-butanediol di(meth)acrylate, 1,6-hexanediol di(meth)acrylate, neopentyl glycol di(meth)acrylate, 1,9-nonanediol di(meth)acrylate, 1,10-decanediol di(meth)acrylate, 1,3-adamantanedimethanol di(meth)acrylate, o-xylylene di(meth)acrylate, m-xylylene di(meth)acrylate, p-xylylene di(meth)acrylate, tris(2-hydroxyethyl)isocyanurate tri(meth)acrylate, tris(acryloyloxy) isocyanurate, bis(hydroxymethyl)tricyclodecane di(meth)acrylate, dipentaerythritol penta(meth)acrylate, dipentaerythritol hexa(meth)acrylate, polyoxyethylene-modified 2,2-bis(4-((meth)acryloxy)phenyl)propane, polyoxypropylene-modified 2,2-bis(4-((meth)acryloxy)phenyl)propane, and polyoxyethylene/polyoxypropylene-modified 2,2-bis(4-((meth)acryloxy)phenyl)propane.

It is to be appreciated that the (alkyl)acrylic compounds above are described in terms of (meth)acrylate species only for brevity, and that one of skill in the art will readily understand that other alkyl and/or hydrido versions of such compounds may equally be utilized. For example, one of skill in the art will understand that the monomer "2-ethylhexyl (meth)acrylate" listed above exemplifies both 2-ethylhexyl (meth)acrylate as well as 2-ethylhexyl acrylate. Likewise, while the acrylic monomers are described generally as propenoates (i.e., α,β-unsaturated esters) in the examples above, it is to be appreciated that the that the term "acrylate" used in these descriptions may equally refer to an acid, salt, and/or conjugate base of the esters exemplified. For example, one of skill in the art will understand that the monomer "methyl acrylate" listed above exemplifies the methyl ester of acrylic acid, as well as acrylic acid, acrylate salts (e.g. sodium acrylate), etc. Furthermore, multifunctional derivatives/variations of the acrylic monomers described above may also be utilized. For example, the monomers "ethyl (meth)acrylate" listed above exemplifies functionalized-derivatives, such as substituted ethyl (meth)acrylates and ethyl acrylates (e.g. hydroxyethyl (meth) acrylate and hydroxyethyl acrylate, respectively).

Comonomers (i.e., monomers reactive with the acrylic monomers above) may also be utilized to prepare the polyacrylates (and polyacrylate moieties). Such monomers are not limited, and generally include compounds having a radically polymerizable group, such as an alkenyl, acryloyl, and alkylacryloyl groups. In general, comonomers are selected by one of skill the in art, e.g. to alter a property of the polyacrylate moiety and/or the silicone-organic copolymer comprising the polyacrylate moiety, to be prepared. For example, it is known in the art that styrene may be copolymerized with an acrylic monomer to prepare polyacrylates (and polyacrylate moieties) having increased hardness as compared to those absent such styrene comonomers. Likewise, comonomers such as acrylonitrile may be utilized to increase interchain polar interactions, and thus increase tensile strength and ultimate toughness of polyacrylates (and polyacrylate moieties), while also decreasing low temperature flexibility of such polyacrylates (and polyacrylate moieties). Moreover, one of skill in the art will readily selected the proportion(s) of monomers utilized, the order of addition, the length of reaction, and other factors to independently tune various properties (e.g. flexibility, solubility, hardness, polarity, glass transition temperature, viscosity, etc.) of the polyacrylate moiety, the silicone-organic copolymer comprising the polyacrylate moiety, and/or compositions and/or products prepared therefrom.

Specific examples of suitable comonomers include styrene, acrylonitrile, vinylidene chloride, vinylidene fluoride, vinyl acetate, vinyl chloride, ethylene, propylene, butylene, chloroprene, isoprene, tetrafluoroethylene, and the like, as well as derivatives thereof.

It is to be appreciated that combinations of acrylic monomers may also be utilized to prepare the polyacrylates, such that the polyacrylates (and polyacrylate moieties) may be homopolymeric or copolymeric with respect to any repeating segments therein. For example, the methods described above may be utilized to prepare multifunctional polyacrylates, e.g. by utilizing a monofunctional acrylic monomer and a polyfunctional acrylic monomer. These different functional monomers are typically selected by one of skill in the art, e.g. based on the reactivity and interpolymeric and/or intrapolymeric interactivity, to alter the mechanical strength of the polyacrylate prepared therewith. For example, cured products comprising the silicone-organic copolymer utilizing a polyacrylate moiety comprising a combination of monofunctional acrylic monomers and polyfunctional acrylic monomers can be prepared with increased mechanical strength as compared to those utilizing a homopolymeric polyacrylate moieties. Likewise, cured products comprising the silicone-organic copolymer utilizing a homopolymeric polyacrylate moiety may be prepared having increased flexibility as compared to those utilizing a polyfunctional polyacrylate moieties.

In specific embodiments, the polyacrylate moiety of the silicone-organic copolymer is prepared from methyl (meth)acrylate, methyl acrylate, butyl (meth)acrylate, butyl acrylate, ethyl acrylate, ethyl methacrylate, 2-ethylhexyl (meth)acrylate, 2-ethylhexyl acrylate, hydroxyethyl (meth)acrylate, hydroxyethyl acrylate, octyl acrylate, octyl methacrylate, hydroxyhexyl acrylate, methacrylic acid, acrylic acid, and/or styrene monomers.

It will also be appreciated that polyacrylates (and polyacrylate moieties) prepared as described above may be mono- or multifunctional with respect to the non-acrylic functional groups present therein. For example, such methods may be utilized to prepare polyacrylate alcohols, diols and/or polyols, including via the methods described above (e.g. by utilizing a hydroxyl-functional monomer) and modifications thereof (e.g. by utilizing a post-polymerization functionalization technique, such as endcapping and/or grafting a functional group-containing compound onto a polyacrylate. Such functional group-containing compounds include alkoxysilyl groups, e.g. which may be grafted onto a polyacrylate via hydrosilylation or other methods known in the art. For example, in certain embodiments, the polyacrylate moiety is prepared from a polyacrylate polyol. In these or other embodiments, the polyacrylate moiety is prepared from a polyacrylate compound comprising a dimethoxymethylsily group. In certain embodiments, the polyacrylate moiety is prepared from a polyacrylate compound comprising at least one radical polymerizable group, such as an acryloyl functional group.

The particular organic moiety Y present in the silicone-organic copolymer is a function of end use applications of the silicone-organic copolymer. For example, certain aliphatic organic moieties generally provide greater flexibility and lower glass transition temperatures ($T_g$) than aromatic organic moieties, which are typically more rigid with higher glass transition temperatures ($T_g$). Polyacrylate moieties formed from acrylate monomers with longer alkyl groups generally provide greater flexibility and lower glass transition temperatures ($T_g$) than polyacrylate moieties formed from acrylate monomers with shorter alkyl groups, which are typically more rigid with higher glass transition temperatures ($T_g$). Similarly, molecular weight and viscosity may be selectively controlled based on desired properties of the silicone-organic copolymer. Further still, the selection of the organic moiety Y can be a function of whether the siloxane moiety Z is present in the silicone-organic copolymer, or whether Y includes any other moieties other than the organic moiety.

The molecular weight of each Y depends on the type of Y. When Y is polyester or polycarbonate, each Y typically has a number average molecular weight ($M_n$) of at least about 100. In certain embodiments, at least one Y has a $M_n$ of at least 100, alternatively at least 125, alternatively at least 150, alternatively at least 200, alternatively at least 250, alternatively at least 300. In these or other embodiments, each Y when Y is polyester or polycarbonate has a $M_n$ of at least 200, alternatively at least 300, alternatively at least 400, alternatively at least 500, alternatively at least 600, alternatively at least 700, alternatively at least 1,000, alternatively at least 2,000, alternatively at least 4,000, alternatively at least 8,000. In certain embodiments, when Y is polyester or polycarbonate, each Y has a maximum $M_n$ of 100,000, alternatively less than 80,000, alternatively less than 50,000, alternatively less than 35,000, alternatively less than 20,000, alternatively less than 19,000, alternatively less than 18,000, alternatively less than 17,000, alternatively less than 16,000, alternatively less than 15,000. When Y is a polyacrylate, at least one Y has a $M_n$ of at least 100, alternatively at least 125, alternatively at least 150, alternatively at least 200, alternatively at least 250, alternatively at least 300. In these or other embodiments, when Y is polyacrylate, each Y has a $M_n$ of at least 200, alternatively at least 300, alternatively at least 400, alternatively at least 500, alternatively at least 600, alternatively at least 700, alternatively at least 1,000, alternatively at least 2,000, alternatively at least 4,000, alternatively at least 8,000. In certain embodiments when Y is polyacrylate, each Y has a maximum $M_n$ of $50 \times 10^6$, alternatively less than $20 \times 10^6$, alternatively less than $10 \times 10^6$, alternatively less than $5 \times 10^6$, alternatively less than $1 \times 10^6$, alternatively less than $5 \times 10^5$, alternatively less than $2.5 \times 10^5$, alternatively less than 1,000,000, alternatively less than 80,000, alternatively less than 50,000, alternatively less than 35,000, alternatively less than 20,000, alternatively less than 19,000, alternatively less than 18,000, alternatively less than 17,000, alternatively less than 16,000, alternatively less than 15,000. The number average molecular weight may be readily determined using Gel Permeation Chromatography (GPC) techniques based on polystyrene standards.

In certain embodiments, each Y can independently be in the form of a solid or a fluid. When Y is in the form of a fluid, the viscosity thereof is normally greater than 100 centipoise at room temperature. Typically, Y has a viscosity of 1,000 to 100,000 centipoise at 25° C. When it is in the form of a solid, Y can have a glass transition temperature of from 20 to 200° C. The choice of glass transition temperature is a matter of matching the need for a specific application. When the organic moiety is hydroxyl functional, the organic moiety can also be characterized by hydroxyl number. The hydroxyl number is determined by the number of hydroxyl groups on each molecule on average and the average molecular weight, and can be from 0.01 to 1200 mg KOH/g, alternatively from 0.1 to 600, alternatively from 1 to 400, alternatively from 1 to 300, alternatively 1 to 150 mg KOH/g.

Each Z is an independently selected siloxane moiety having the formula $[R^1{}_h SiO_{(4-h)/2}]_d$. In each siloxane moiety Z, $R^1$ is as defined above. Each subscript d is from 1 to 1000, such as from 1 to 500, alternatively from 1 to 300, alternatively from 1 to 100, alternatively from 1 to 50, alternatively from 1 to 10. Each subscript h is independently selected from 0 to 2 in each moiety indicated by subscript d, such as 0, 1, or 2. Each siloxane moiety Z may independently comprise a linear siloxane, a branched siloxane, or both. Likewise, any particular siloxane moiety Z may itself comprise linear or branched segments, or comprise both linear and branched segments. As such, Z may be a linear siloxane moiety, a branched siloxane moiety, or a siloxane moiety comprising at least one linear and also at least one branched segment. In certain embodiments, Z is branched (i.e., comprises at least one branched segment).

In certain embodiments, each organic moiety Y is linear such that the silicone-organic copolymer may have one of the following structures:

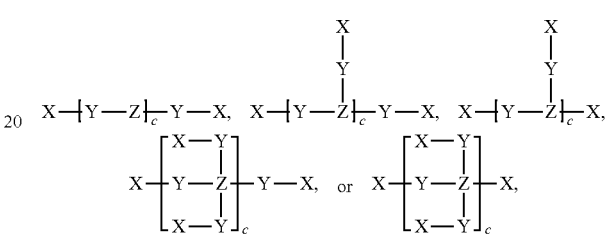

where each X, Y, Z, and subscript c are defined above. Alternatively, each organic moiety Y may be branched. For example, the silicone-organic copolymer may have one of the following structures:

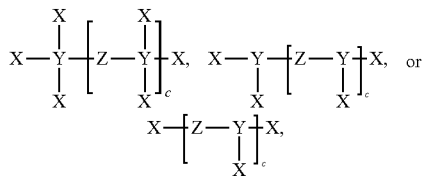

where each X, Y, Z, and subscript c are defined above. As shown in these structures, each siloxane moiety Z may be linear or branched. In particular embodiments, both organic moiety Y and siloxane moiety Z may be branched, such that the silicone-organic copolymer may have one of the following structures:

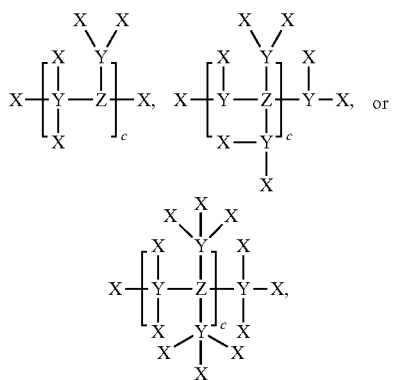

where each X, Y, Z, and subscript c are defined above.

In certain embodiments, Y further comprises at least one moiety in addition to and different from the organic moiety. The at least one moiety may be another organic moiety different from the organic moiety Y in any aspect, such as molecular weight, viscosity, structure, etc. Alternatively or in addition, the at least one moiety may be something other than an organic moiety altogether.

Specific examples of the at least one moiety an alkylaluminoxane moiety, an alkylgermoxane moiety, a polythioester moiety, a polyether moiety, a polythioether moiety, a polyester moiety, a polyacrylonitrile moiety, a polyacrylamide moiety, a polycarbonate moiety, an epoxy moiety, a polyurethane moiety, a polyurea moiety, a polyacetal moiety, a polyolefin moiety, a polyvinyl alcohol moiety, a polyvinyl ester moiety, a polyvinyl ether moiety, a polyvinyl ketone moiety, a polyisobutylene moiety, a polychloroprene moiety, a polyisoprene moiety, a polybutadiene moiety, a polyvinylidiene moiety, a polyfluorocarbon moiety, a polychlorinated hydrocarbon moiety, a polyalkyne moiety, a polyamide moiety, a polyimide moiety, a polyimidazole moiety, a polyoxazole moiety, a polyoxazine moiety, a polyoxidiazole moiety, a polythiazole moiety, a polysulfone moiety, a polysulfide moiety, a polyketone moiety, a polyetherketone moiety, a polyanhydride moiety, a polyamine moiety, a polyimine moiety, a polyphosphazene moiety, a polysaccharide moiety, a polypeptide moiety, a polyisocyante moiety, a cellulosic moiety, and combinations thereof. Each Y may independently comprise at least one moiety other than the organic moiety Y. When there are a plurality of moieties other than the organic moiety Y, the moieties may be independently selected.

In other embodiments, Y consists essentially of the organic moiety, alternatively Y consists of the organic moiety.

In certain embodiments, the silicone-organic copolymer has the formula: $[XA]_g[Z_jY_o]_c$, wherein each silicone moiety X is bonded to one organic moiety Y or one siloxane moiety Z via A, wherein each A is independently selected from a covalent bond, $-D^2-O-C(=O)-NH-$, $-D^2-NH-C(=O)-NH-$, $-D^2-NR^3-CH_2CH_2C(=O)O-$, and $-D^2-OC(=O)-CH_2CH_2NR^3-$, where $D^2$ is a divalent group and $R^3$ is H or $R^1$, where $R^1$ is defined above. A is typically a covalent bond when X is bonded to Y or Z via hydrosilylation, but may be other than a covalent bond when other reaction mechanisms are utilized to form the silicone-organic copolymer. Each silicone moiety X may be pendent, terminal, or in both locations in the silicone-organic copolymer. The particular structure associated with A is a function of the method of preparing the silicone-organic copolymer, as described below. In certain embodiments, each X is boned to one Y.

When each silicone moiety X is terminal and the silicone-organic polymer is linear, the silicone-organic may have the following structure:

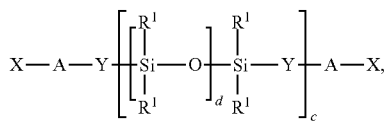

wherein each X, Y, A, $R^1$, subscript c, and subscript d is defined above.

A method of preparing the silicone-organic copolymer is also disclosed. The method comprises reacting an organic compound having on average more than one unsaturated group, a chain extending organosilicon compound having on average more than one silicon-bonded hydrogen atom, and an endcapping organosilicon compound, to give the silicone-organic copolymer.

As will be understood by one of skill in the art in view of the description herein, the organic compound utilized in the method forms a portion of the silicone-organic copolymer corresponding to the organic moiety Y, the endcapping organosilicon compound utilized in the method forms a portion of the silicone-organic copolymer corresponding to the silicone moiety X, and the chain extending organosilicon compound utilized in the method forms a portion of the silicone-organic copolymer corresponding to moiety Z. In certain embodiments, the method further comprises reacting, along with the organic compound, the endcapping organosilicon compound, and the chain extending organosilicon compound, a hybridizing compound having on average more than one unsaturated group. The hybridizing compound, if utilized, becomes part of Y along with the organic moiety. In certain embodiments, the method is free from the chain extending organosilicon compound and the hybridizing compound. In other embodiments, the method utilizes the chain extending organosilicon compound or the hybridizing compound but not the other. In yet further embodiments, the method utilizes both the chain extending organosilicon compound and the hybridizing compound.

Typically, the organic compound has the formula: $Y[R^4]_i$, where each $R^4$ is an independently selected unsaturated group having from 2 to 14 carbon atoms; subscript i is >1; and Y is organic moiety comprising at least one organic group. When Y is the polyester moiety, Y comprises at least one ester group; when Y is the polycarbonate moiety; Y includes at least one carbonate group; and when Y is the polyacrylate moiety, Y includes at least one acrylate group.

Each $R^4$ is an independently selected unsaturated group having from 2 to 14 carbon atoms. Typically, $R^4$ comprises, alternatively is, an alkenyl group or an alkynyl group. Specific examples thereof include $H_2C=CH-$, $H_2C=CHCH_2-$, $H_2C=CHCH_2CH_2-$, $H_2C=CH(CH_2)_3-$, $H_2C=CH(CH_2)_4-$, $H_2C=C(CH_3)-$, $H_2C=C(CH_3)CH_2-$, $H_2C=C(CH_3)CH_2CH_2-$, $H_2C=C(CH_3)CH_2CH(CH_3)-$, $H_2C=C(CH_3)CH(CH_3)CH_2-$, $H_2C=C(CH_3)C(CH_3)_2-$, $HC\equiv C-$, $HC\equiv CCH_2-$, $HC\equiv CCH(CH_3)-$, $HC\equiv CC(CH_3)_2-$, and $HC\equiv CC(CH_3)_2CH_2-$.

In certain embodiments, each $R^4$ has the formula $CH_2C(R^3)-[D^2]_m-$, wherein each $R^3$ is independently a hydrocarbyl group having from 1 to 6 carbon atoms, an alkoxy group, a silyl group, or H; each $D^2$ is an independently selected divalent group having from 1 to 6 carbon atoms, and subscript m is 0 or 1. In certain embodiments, $R^3$ is $-CH_3$. In these or other embodiments, $D^2$ is $-CH_2-$. In specific embodiments, each $R^4$ is $H_2C=C(CH_3)CH_2-$.

Subscript i is >1, such as 2, 3, 4, 5, 6, etc. Generally, the organic compound comprises an $R^4$ at each terminus of Y, such that subscript i corresponds to the valency of Y, which is at least 2, but may be 3, 4, 5, or higher depending on the branching thereof.

Each Y is an organic moiety comprising at least one organic group, such as any of the organic groups described above, or derivatives thereof. For example, organics produced by known methods may be readily functionalized with unsaturated group functionality to give the organic compound. Such organics are commercially available.

As introduced above, the endcapping organosilicon compound utilized in the method forms the silicone moiety X. As such, the endcapping organosilicon compound may be any organosilicon compound suitable for forming the silicone-organic copolymer, as understood in the art. Typically, the endcapping organosilicon compound is an organohydrogensiloxane compound including at least one silicon-bonded hydrogen atom. The silicon-bonded hydrogen atom of the organohydrogensiloxane compound reacts with the unsaturated group $R^4$ of the organic compound via a hydrosilylation reaction in the presence of the hydrosilylation catalyst utilized in the method. Alternatively, the endcapping organosilicon compound can include an ethylenically unsaturated group to react via hydrosilylation with a silicon-bonded hydrogen atom of, for example, the chain extending compound when forming the silicone-organic copolymer.

In certain embodiments, the endcapping organosilicon compound is an organohydrogensiloxane compound having formula $HSiR^1_a(OR)_{3-a}$, where $R^1$, R and subscript a are defined above. In other embodiments, the endcapping organosilicon compound is an organohydrogensiloxane compound having formula $H-D^1-SiR^1_a(OR)_{3-a}$, where $D^1$ is a divalent linking group. In the latter embodiment, $D^1$ generally includes a silicon atom such that the terminal H is a silicon-bonded hydrogen atom. $D^1$ can be a hydrocarbon chain capped with a silicon hydride moiety, or $D^1$ can be a siloxane moiety or polysiloxane moiety.

The chain extending organosilicon is typically an organohydrogensiloxane having at least 2 terminal silicon-bonded H atoms. However, the chain extending organosilicon compound may be branched, and have 3, 4, or more terminal silicon-bonded H atoms. For example, the chain extending organosilicon compound may have one of the following formulas:

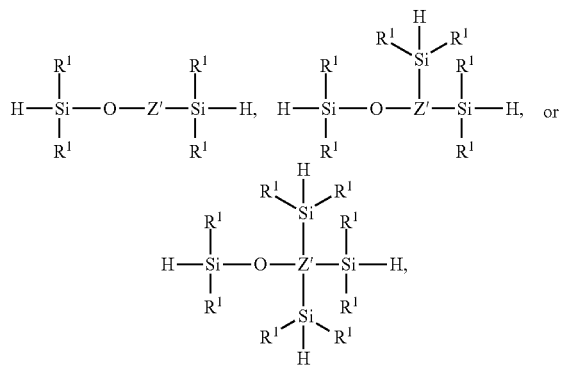

wherein Z' is a siloxane moiety and each $R^1$ is as defined above. As such, the chain extending organosilicon compound typically comprises a linear silicon hydride functional organosilicon compound, a branched silicon hydride functional organosilicon compound, or both.

In some embodiments, the chain extending organosilicon compound comprises a siloxane moiety Z' of formula $[R^1_{h'}SiO_{(4-h'y/2)}]_{d'}$, wherein subscript d' is from 1 to 1000, subscript h' is independently selected from 0 to 2 in each moiety indicated by subscript d', and $R^1$ is as defined above. In such embodiments, the chain extending organosilicon compound typically comprises hydrides bonded to terminal silicon atoms of the siloxane moiety Z', terminal silyl groups having silicon-bonded H atoms, or a combination thereof.

In certain embodiments, the siloxane moiety Z' is linear, and the chain extending organosilicon compound is an organohydrogensiloxane having the formula:

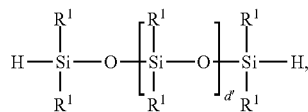

wherein each $R^1$ is as defined above, and subscript d' is from 1 to 999.

When Y further comprises at least one moiety in addition to and different from the organic moiety, the method further comprises reacting a hybridizing compound along with the organic compound, the endcapping organosilicon compound, and optionally the chain extending organosilicon compound. Specific examples of suitable moieties are set forth above. One of skill in the art readily understands the hybridizing compounds which provide the optional moieties described above. In certain embodiments, the method is free from reacting the hybridizing compound along with the organic compound, the endcapping organosilicon compound, and optionally the chain extending organosilicon compound.

The organic compound, the endcapping organosilicon compound, the chain extending organosilicon compound, and optionally the hybridizing compound, may be reacted in any order or combination to give the silicone-organic copolymer, as understood in the art. In certain embodiments, the method comprises reacting the organic compound and the chain extending organosilicon compound in the presence of the hydrosilylation catalysts to give a siloxane-organic compound (i.e., a chain-extended silicone-organic compound), and reacting the siloxane-organic compound and the endcapping organosilicon compound in the presence of a hydrosilylation catalyst to give the silicone-organic copolymer. The siloxane-organic compound may be prepared by any suitable technique.

The siloxane-organic compound, if formed and utilized in such embodiments, forms a portion of the silicone-organic copolymer having the formula $[Z_jY_o]_c$, where Z, Y, subscript c, and subscript j, and subscript o are defined above. For example, when organic moieties Y and siloxane moieties Z are linear, the siloxane-organic compound may have the formula:

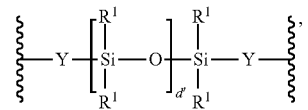

where each Y, $R^1$, subscript c, and subscript d are as defined above. Thus, the siloxane-organic compound utilized may be selected based on the desired structure of the silicone-organic copolymer, e.g. based on molecular weight, the particular structure of (i.e., units within) each Y, the degree of polymerization of the siloxy units represented by subscript d, etc.

In certain embodiments, the siloxane-organic compound has the formula:

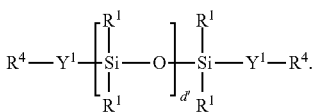

In such embodiments, each $Y^1$ and $R^1$ is as defined above, and subscript c is typically from 1 to 150, such as from 1 to 100, alternatively from 1 to 50, alternatively from 1 to 25, alternatively from 1 to 10, and alternatively from 1 to 5. Typically, each subscript d is from 1 to 1000, such as from 1 to 500, alternatively from 1 to 300, alternatively from 1 to 100, alternatively from 1 to 50, alternatively from 1 to 10, in each moiety indicated by subscript c.

The organic compound and the chain extending organosilicon compound are typically reacted in a molar ratio of from 1.001:1 to 2:1; alternatively from 1.4:1 to 1.7:1; alternatively from 1.05:1 to 1.5:1; alternatively from 1.1:1 to 1.2:1; alternatively from 1.2:1 to 1.5:1. The siloxane-organic compound is typically formed by the molar ratio of the organic compound and the chain extending organosilicon compound to reach a desired value of subscript c.

The silicone-organic compound and the endcapping organosilicon compound are typically reacted in a molar ratio between unsaturated groups of the silicone-organic and silicon hydride groups of the endcapping organosilicon compound of from 1.5:1 to 1:2.5, alternatively from 1.4:1 to 1:2, alternatively from 1.3:1 to 1:1.5, alternatively from 1.2:1 to 1:1.2, alternatively from 1.1:1 to 1:1.1, alternatively from 1.1:1 to 1:1. When the silicone-organic is difunctional, the silicone-organic copolymer is typically formed by a 1:2 molar ratio of the silicone-organic compound and the endcapping organosilicon compound, although a molar excess of one relative to the other may be utilized.

In certain embodiments, the method comprises reacting the organic compound and the endcapping organosilicon compound in the presence of the hydrosilylation catalyst to give an endcapped silicone-organic compound, and reacting the endcapped silicone-organic compound and the chain extending organosilicon compound in the presence of the hydrosilylation catalyst to give the silicone-organic copolymer. In these or other embodiments, the method comprises reacting at least some of the organic compound and some of the endcapping organosilicon compound to give the endcapped silicone-organic compound, and also reacting at least some of the organic compound and some of the chain extending organosilicon compound to give the siloxane-organic compound, as each described above.

The hydrosilylation-reaction catalyst is not limited and may be any known hydrosilylation-reaction catalyst for catalyzing hydrosilylation reactions. Combinations of different hydrosilylation-reaction catalysts may be utilized.

In certain embodiments, the hydrosilylation-reaction catalyst comprises a Group VIII to Group XI transition metal. Group VIII to Group XI transition metals refer to the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the hydrosilylation-reaction catalyst.

Additional examples of catalysts suitable for the hydrosilylation-reaction catalyst include rhenium (Re), molybdenum (Mo), Group IV transition metals (i.e., titanium (Ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the hydrosilylation-reaction catalyst.

The hydrosilylation-reaction catalyst may be in any suitable form. For example, the hydrosilylation-reaction catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The hydrosilylation-reaction catalyst may be in or on a solid carrier. Examples of carriers include activated carbons, silicas, silica aluminas, aluminas, zeolites and other inorganic powders/particles (e.g. sodium sulphate), and the like. The hydrosilylation-reaction catalyst may also be disposed in a vehicle, e.g. a solvent which solubilizes the hydrosilylation-reaction catalyst, alternatively a vehicle which merely carries, but does not solubilize, the hydrosilylation-reaction catalyst. Such vehicles are known in the art.

In specific embodiments, the hydrosilylation-reaction catalyst comprises platinum. In these embodiments, the hydrosilylation-reaction catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are also known in the art, as exemplified in U.S. Pat. Nos. 4,766,176 and 5,017,654, which are incorporated by reference herein in their entireties.

Complexes of platinum with organopolysiloxanes suitable for use as the hydrosilylation-reaction catalyst include 1,3-diethenyl-1,1,3,3-tetramethyldisiloxane complexes with platinum. These complexes may be microencapsulated in a resin matrix. Alternatively, the hydrosilylation-reaction catalyst may comprise 1,3-diethenyl-1,1,3,3-tetramethyldisiloxane complex with platinum. The hydrosilylation-reaction catalyst may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole $(COD)PtCl_2$ with 0.045 mole COD and 0.0612 moles $HMeSiCl_2$, where COD represents cyclooctadiene.

Additional examples of suitable hydrosilylation catalysts for component are described in, for example, U.S. Pat. Nos. 3,159,601; 3,220,972; 3,296,291; 3,419,593; 3,516,946; 3,814,730; 3,989,668; 4,784,879; 5,036,117; and 5,175,325; the disclosures of which are incorporated herein by reference in their entireties.

The hydrosilylation catalyst may also, or alternatively, be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm).

A second method of preparing the silicone-organic copolymer is disclosed. This second method comprises reacting an organic compound having one terminal unsaturated group and one terminal hydroxyl group with an endcapping organosilicon compound in the presence of a hydrosilylation catalyst to give a hydroxyl-functional intermediate. This second method further comprises reacting the hydroxyl-functional intermediate with a polyisocyanate to give an isocyanate-functional intermediate, and reacting the isocyanate-functional intermediate and an organic compound having on average more than one hydroxyl group to give the silicone-organic copolymer.

The organic compound is not limited and may be any organic compound including one terminal unsaturated group and one terminal hydroxyl group. For example, the organic compound may be an unsaturated alcohol such as allyl alcohol, or a polymer such as polyether, a polyester, a polycarbonate, etc. The organic compound may introduce further organic moieties into the silicone-organic copolymer, or may introduce additional hybridizing segments when the organic compound is something other than an organic. In certain embodiments, the organic compounds a polyether compound.

In certain embodiments, the polyether compound has the average formula $R^4O(C_nH_{2n}O)_{w'}H$, wherein $R^4$ is defined above; each subscript n is independently selected from 2 to 4 in each moiety indicated by subscript w'; and subscript w' is from 1 to 200. Those skilled in the art readily understand that impurities or alternative groups may exist in the polyether compound which do not substantially diminish the utility or properties of the resulting silicone-polyether copolymer formed therewith. Examples of such impurities or alternative groups include certain molecules of the polyether compound having two terminal unsaturated groups.

In certain embodiments, the polyether compound has the formula $—R^3O(C_2H_4O)_{x'}(C_3H_6O)_{y'}(C_4H_8O)_{z'}H$, wherein $R^3$ is defined above; subscript x' is from 0 to 200; subscript y' is from 1 to 200; and subscript z' is from 0 to 200; and wherein units indicated by subscripts x', y' and z' may be in randomized or block form in the polyether compound. Generally, the polyoxyalkylene moieties indicated by subscripts x', y', and z' are nonreactive when forming the silicone-organic copolymer. Thus, x' of the polyether compound becomes x of Y; y' of the polyether compound becomes y of Y; and z' of the polyether compound becomes z of Y. As with Y, described above, each of the oxyalkylene units indicated by subscripts x', y', and z' may independently be branched or linear.

In specific embodiments, the polyether compound comprises only oxypropylene units ($C_3H_6O$). Representative, non-limiting examples of such polyether compounds include: $H_2C=CHCH_2O[C_3H_6O]_{y'}H$, $H_2C=CHO[C_3H_6O]_{y'}H$, $H_2C=C(CH_3)CH_2O[C_3H_6O]_{y'}H$, $HC≡CCH_2O[C_3H_6O]_{y'}H$, and $HC≡CC(CH_3)_2O[C_3H_6O]_{y'}H$, where y' is as defined above. Each oxypropylene unit may independently be of formula $—CH_2CH_2CH_2O—$, $—CH_2CHCH_3O—$, or $—CHCH_3CH_2O—$.

The polyether compound may be prepared by, for example, the polymerization of ethylene oxide, propylene oxide, butylene oxide, 1,2-epoxyhexane, 1,2-epoxyoctane, and/or cyclic epoxides, such as cyclohexene oxide or exo-2,3-epoxynorborane.

The polyether compound typically has a number average molecular weight ($M_n$) of at least about 100. In certain embodiments, the polyether compound has a $M_n$ of at least 200, alternatively at least 300, alternatively at least 400, alternatively at least 500, alternatively at least 600, alternatively at least 700, alternatively at least 1,000, alternatively at least 2,000, alternatively at least 3,000, alternatively at least 5,000, alternatively at least 10,000, alternatively at least 20,000, alternatively up to 30,000. In specific embodiments, the polyether compound has a $M_n$ of from 700 to 900. The number average molecular weight may be readily determined using Gel Permeation Chromatography (GPC) techniques based on polystyrene standards or using end group analysis by nuclear magnetic resonance spectroscopy.

The endcapping organosilicon compound utilized in the method forms the silicone moiety X of the silicone-organic copolymer. The endcapping organosilicon compound may be any organosilicon compound suitable for forming the silicone-organic copolymer, as understood in the art. Typically, the endcapping organosilicon compound is an organohydrogensiloxane compound including at least one silicon-bonded hydrogen atom. The silicon-bonded hydrogen atom of the organohydrogensiloxane compound reacts with $R^4$ of the organic compound via a hydrosilylation reaction to give the hydroxy-functional intermediate.

Specific examples of suitable endcapping organosilicon compounds are set forth above with respect to the first method. Specific examples of suitable hydrosilylation catalysts are also set forth above.

The organic compound and the endcapping organosilicon compound are typically reacted in a molar ratio of from 5:1 to 1:5; alternatively from 4:1 to 1:4; alternatively from 3:1 to 1:3; alternatively from 2:1 to 1:2; alternatively to 1.1:1 to 1:1.1. The hydroxy-functional intermediate is typically formed by a 1.2:1 molar ratio of the organic compound and the endcapping organosilicon compound, although a different molar excess of one relative to the other may be utilized.

This second method further comprises reacting the hydroxyl-functional intermediate with a polyisocyanate to give an isocyanate-functional intermediate.

The polyisocyanate is not limited and may be an aliphatic, cycloaliphatic, araliphatic and/or aromatic polyisocyanate. The polyisocyanate advantageously contains at least 2.0 isocyanate groups per molecule. A typical isocyanate functionality of the polyisocyanate is from about 2.0 to about 3.0 or from about 2.0 to about 2.5 isocyanate groups per molecule. However, the polyisocyanate may be utilized as a blend. When the polyisocyanate is utilized as a blend, the polyisocyanate typically has a nominal functionality of at least 1.6, alternatively at least 1.7, alternatively at least 1.8.

In certain embodiments, the polyisocyanate is selected from the group of diphenylmethane diisocyanates (MDIs), butanediisocyanate, polymeric diphenylmethane diisocyanates (pMDIs), toluene diisocyanates (TDIs), hexamethylene diisocyanates (HDIs), isophorone diisocyanates (IPDIs), naphthalene diisocyanates (NDIs), and combinations thereof.

Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI (H12 MDI), naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenylmethane-4,4'-diisocyanate, 4,4',4"-triphenylmethane diisocyanate, polymethylene polyphenylisocyanates, hydrogenated polymethylene polyphenyl polyisocyanates, toluene-2,4,6-triisocyanate and 4,4'-dimethyldiphenylmethane-2,2',5,5'-tetraisocyanate. The polyisocyanate may be modified to include urea, isocyanurate, uretidinedione, allophonate, biuret, carbodiimide, urethane or other linkages.

In certain embodiments, the polyisocyanate comprises a diisocyanate. For example, the diisocyanate may have formula OCN-D'-NCO, wherein D' is a divalent linking group. When the diisocyanate comprises MDI, D' is a methylene diphenyl moiety. However, the diisocyanate need not be symmetrical and the isocyanate functional groups need not be terminal. For example, the diisocyanate may have formula (OCN)$_2$-D', where D' is defined above. The isocyanate functional groups may be bonded to the same or different atoms within D'.

In certain embodiments, the polyisocyanate is an isocyanate-terminated prepolymer. The isocyanate-terminated prepolymer is a reaction product of an isocyanate and a polyol and/or a polyamine, as understood in the polyurethane art. The polyisocyanate may be any type of polyisocyanate known to those skilled in the polyurethane art, such as one of the polyisocyanates described above. If employed to make the isocyanate-terminated prepolymer, the polyol is typically selected from the group of ethylene glycol, diethylene glycol, propylene glycol, dipropylene glycol, butane diol, glycerol, trimethylolpropane, triethanolamine, pentaerythritol, sorbitol, and combinations thereof. If employed to make the isocyanate-terminated prepolymer, the polyamine is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof. It is to be appreciated that the isocyanate-terminated prepolymer may be formed from a combination of two or more of the aforementioned polyols and/or polyamines.

The hydroxyl-functional intermediate and the polyisocyanate are typically reacted in a molar ratio of from 5:1 to 1:5; alternatively from 4:1 to 1:4; alternatively from 3:1 to 1:3; alternatively from 2:1 to 1:2; alternatively to 1.1:1 to 1:1.1. The isocyanate-functional intermediate is typically formed by a 1:1 molar ratio of the hydroxyl-functional intermediate and the polyisocyanate, although a molar excess of one relative to the other may be utilized.

In certain embodiments, the hydroxyl-functional intermediate and the polyisocyanate are reacted to form the isocyanate-functional intermediate in the presence of a catalyst. Examples of catalysts include tertiary amines; tin carboxylates; organotin compounds; tertiary phosphines; various metal chelates; metal salts of strong acids, such as ferric chloride, stannic chloride, stannous chloride, antimony trichloride, bismuth nitrate and bismuth chloride, and the like. Tertiary amine and tin catalysts are typical.

Exemplary examples of tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-cocomorpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl) amino-ethoxy ethanol, N,N,N', N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine.

Exemplary examples of tin-containing catalysts include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, dimethyltindineodecanoate, and the like.

The second method further comprises reacting the isocyanate-functional intermediate and an organic compound having on average more than one hydroxyl group to give the silicone-organic copolymer. When the silicone-organic copolymer is formed via the second method, A is typically selected from -D$^2$-O—C(=O)—NH—, and -D$^2$-NH—C(=O)—NH—, where D$^2$ is a divalent group.

As will be understood by one of skill in the art in view of the description herein, the organic compound utilized in the method forms a portion of the silicone-organic copolymer corresponding to the organic moiety Y, the endcapping organosilicon compound utilized in the method forms a portion of the silicone-organic copolymer corresponding to the silicone moiety X, and the chain extending organosilicon compound utilized in the method forms a portion of the silicone-organic copolymer corresponding to the siloxane moiety Z.

In certain embodiments, the method further comprises reacting, along with the organic compound, the endcapping organosilicon compound, and the chain extending organosilicon compound, a hybridizing compound having on average more than one hydroxyl group. The hybridizing compound, if utilized, becomes part of Y along with the organic moiety. In certain embodiments, the method is free from the hybridizing compound. In other embodiments, the method utilizes the hybridizing compound. The chain extending organosilicon compound may be any of those set forth above with respect to the first method of preparing the silicone-organic copolymer, with the only difference between any silicon-bonded hydrogen atoms from the first method are instead silicon-bonded hydroxyl groups in the second method.

Typically, the organic compound has the formula: Y[OH]$_i$, where subscript i is >1; and Y is organic moiety comprising at least one organic group.

Subscript i is >1, such as 2, 3, 4, 5, 6, etc. Generally, the organic compound comprises a hydroxyl group at each terminus of Y, such that subscript i corresponds to the valency of Y, which is at least 2, but may be 3, 4, 5, or higher depending on the branching thereof.

Each Y is an organic moiety comprising at least one organic group, such as any of the organic groups described above, or derivatives thereof. For example, organics produced by known methods may be readily functionalized with hydroxyl functionality to give the organic compound. Such organics are commercially available.

A third method of preparing the silicone-organic copolymer is additionally disclosed. This third method comprises reacting an organic compound having on average more than one hydroxyl group, a chain extending organosilicon compound having on average more than one hydroxyl group, a polyisocyanate compound, and an endcapping organosilicon compound having an isocyanate functional group, to give the silicone-organic copolymer.

In the third method, the organic compound utilized in the method forms a portion of the silicone-organic copolymer corresponding to the organic moiety Y. Thus, the organic compound can be, for example, a polyester, a polycarbonate, or a polyacrylate having hydroxyl functionality. The chain extending organosilicon compound may be any of those set forth above with respect to the first method of preparing the silicone-organic copolymer, with the only difference between any silicon-bonded hydrogen atoms from the first method are instead silicon-bonded hydroxyl groups in the second method. The endcapping organosilicon compound typically has the following formula in this third method: $OCN-D^1-SiR^1_a(OR)_{3-a}$, where $D^1$, $R^1$, R, and subscript a are defined above. Suitable examples of polyisocyanate compounds are set forth above.

Other methods of preparing the silicone-organic copolymer can be readily envisaged by one of skill in the art based on modifications or replacements of functional groups and reaction schemes.

For example, in one embodiment, the silicone-organic copolymer can be prepared by reacting a polysiloxane with more than one hydroxyl group and a polyisocyanate to give an isocyanate-functional polysiloxane. The isocyanate-functional polysiloxane can be reacted with the hydroxyl-functional intermediate described above, and the reaction product thereof can be reacted with and then react with an organic compound with more than one hydroxyl group, optionally in the presence of any further amount of polyisocyanate, hydroxyl functional polysiloxane, or isocyanate-functional polysiloxane.

In a second embodiment, the silicone-organic copolymer can be prepared by reacting a polysiloxane with more than one hydroxyl group and a polyisocyanate to give an isocyanate-functional polysiloxane. The isocyanate-functional polysiloxane can be reacted with an organic compound having more than one hydroxyl group and the isocyanate-functional intermediate described above, optionally in the presence of any further amount of polyisocyanate or organic polyhydroxyl compounds.

In a third embodiment, the silicone-organic copolymer can be prepared by reacting a polysiloxane with more than one hydroxyl group, a hydroxyl-functional organic compound, and a polyisocyanate to give a isocyanate-functional prepolymer. The isocyanate-functional pre-polymer may be reacted with the hydroxyl-functional intermediate described above.

In a fourth embodiment, the silicone-organic copolymer can be prepared by reacting a polysiloxane with more than one amino group and a polyisocyanate to give an isocyanate-functional polysiloxane. The isocyanate-functional polysiloxane may be reacted with the hydroxyl-functional intermediate described above to give a further intermediate. The further intermediate can be reacted with an organic compound having more than one isocyanate-reactive group, optionally in the presence of any further amount of polyisocyanate, amino-functional polysiloxane, or isocyanate-functional polysiloxane.

In a fifth embodiment, the silicone-organic copolymer can be prepared by reacting a polysiloxane with more than one amino group and a polyisocyanate to give an isocyanate-functional polysiloxane. The isocyanate-functional polysiloxane may be reacted with an organic compound having more than one isocyanate-reactive group and the isocyanate-functional intermediate described above, optionally in the presence of any further amount of polyisocyanate organic polyhydroxyl compounds.

In a sixth embodiment, the silicone-organic copolymer can be prepared by mixing an amino-functional polysiloxane and an amino-functional organic compound to give a mixture. The mixture can be reacted with polyisocyanate to give an isocyanate-functional prepolymer. The isocyanate-functional prepolymer can be reacted with the hydroxyl-functional intermediate described above.

In a seventh embodiment, the silicone-organic copolymer can be prepared by initiating polymerization of acrylates, including hydroxyl-functional acrylate, optionally in the presence of acrylate-functional organopolysiloxane or siloxane, to give a hydroxyl-functional copolymer. The hydroxyl-functional copolymer can be reacted with the isocyanate-functional intermediate described above.

In an eighth embodiment, the silicone-organic copolymer can be prepared by Michael addition with the organic-silicone copolymer includes acrylate moieties. An organic having acrylate groups can be reacted with a diamino-functional polysiloxane to give an intermediate. The intermediate can be reacted with an aminoalkyl-alkoxysilane or an acrylate-functional alkoxysilane to give the silicone-organic copolymer.

A sealant comprising the silicone-organic copolymer is also provided. More specifically, the sealant comprises: (1) a copolymer comprising the silicone-organic copolymer; and (II) a condensation reaction catalyst.

The (II) condensation reaction catalyst is not limited and, in some embodiments, is exemplified by tin catalysts, titanium catalysts, zirconate catalysts, and zirconium catalysts. General examples of suitable tin catalysts include organotin compounds where the valence of the tin is either +4 or +2 (e.g. tin (IV) compounds and/or tin (II) compounds). Specific examples of tin (IV) compounds include stannic salts of carboxylic acids such as dibutyl tin dilaurate, dimethyl tin dilaurate, di-(n-butyl)tin bis-ketonate, dibutyl tin diacetate, dibutyl tin maleate, dibutyl tin diacetylacetonate, dibutyl tin dimethoxide, carbomethoxyphenyl tin tris-uberate, dibutyl tin dioctanoate, dibutyl tin diformate, isobutyl tin triceroate, dimethyl tin dibutyrate, dimethyl tin di-neodeconoate, dibutyl tin di-neodeconoate, triethyl tin tartrate, dibutyl tin dibenzoate, butyltintri-2-ethylhexanoate, dioctyl tin diacetate, tin octylate, tin oleate, tin butyrate, tin naphthenate, dimethyl tin dichloride, a combination thereof, and/or a partial hydrolysis product thereof. Additional examples of tin (IV) compounds are known in the art and are commercially available, such as Metatin® 740 and Fascat® 4202 from Acima Specialty Chemicals of Switzerland, Europe, which is a business unit of The Dow Chemical Company, as well as Formrez® UL-28 from Galata Chemicals of Hahnville, La. Specific examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, stannous stearate, stannous naphthanate, stannous hexanoate, stannous succinate, stannous caprylate, and a combination thereof. Examples of suitable titanium catalysts include titanium esters such as tetra-n-butyltitanate tetraisopropyltitanate, tetra-2-ethylhexyltitanate, tetraphenyltitanate, triethanolamine titanate, organosiloxytitanium compounds, and dicarbonyl titanium compounds, such as titanium ethyl acetoacetate, diisopropoxydi(ethoxyacetoacetyl) titanium and bis(acetoacetonyl)-diisopropoxy titanium (IV). Many of these titanium catalysts are commercially available, such as Tyzor™ DC, Tyzor™ TnBT, and Tyzor™ 9000 from Doft Ketal Specialty Catalysts LLC of Houston, Tex. In certain embodiments, the (II) condensation reaction catalyst is a titanium catalyst, such as one of those exemplified above, e.g. where the sealant is or may be formulated as a room temperature vulcanizing sealant composition. The amount of the (II) condensation reaction catalyst present in the sealant depends on various factors (e.g. the amount and/or type of the (1) copolymer, the types and/or amounts of any additional materials present in the sealant, etc.), and may be readily determined by one of skill in the art. Typically, the sealant comprises the (II) condensation reaction catalyst in an amount of from 0.2 to 6, alternatively from 0.5 to 3, parts by weight based on the total weight of the (1) copolymer present in the sealant.

In some embodiments, the sealant further comprises one or more additives. Examples of suitable additives that may be present in the sealant include fillers, treating agents (e.g. filler treating agents), cross-linkers, adhesion promotors, surface modifiers, drying agents, extenders, biocides, flame retardants, plasticizers, end-blockers, binders, anti-aging additives, water release agents, pigments, rheology modifiers, carriers, tackifying agents, corrosion inhibitors, catalyst inhibitors, viscosity modifiers, UV absorbers, anti-oxidants, light-stabilizers, and the like, as well as combinations thereof.

In certain embodiments, the sealant includes a filler. The filler may be or comprise a reinforcing filler, an extending filler, a conductive filler (e.g., electrically conductive, thermally conductive, or both), or the like, or a combination thereof. Examples of suitable reinforcing fillers include precipitated calcium carbonates and reinforcing silica fillers such as fume silica, silica aerogel, silica xerogel, and precipitated silica. Specific suitable precipitated calcium carbonates include Winnofil® SPM from Solvay and Ultrapflex® and Ultrapflex® 100 from Specialty Minerals, Inc. Examples of fumed silicas are known in the art and are commercially available, such as those sold under the name CAB-O-SIL by Cabot Corporation of Massachusetts, U.S.A. Examples of suitable extending fillers include crushed quartz, aluminum oxide, magnesium oxide, calcium carbonate such as ground calcium carbonate, precipitated calcium carbonate, zinc oxide, talc, diatomaceous earth, iron oxide, clays, mica, chalk, titanium dioxide, zirconia, sand, carbon black, graphite, or a combination thereof. Examples of extending fillers are known in the art and are commercially available, including ground quartz sold under the name MIN-U-SIL by U.S. Silica of Berkeley Springs, W. Va. Other examples of commercially available extending fillers include calcium carbonates sold under the name CS-11 from Imerys, G3T from Huber, Pfinyl 402 from Specialty Minerals, Inc. and Omyacarb 2T from Omya. The amount of the filler present in the sealant depends on various factors (e.g. the amount and/or type of the (I) copolymer, the types and/or amounts of any additional materials present in the sealant, etc.), and may be readily determined by one of skill in the art. The exact amount of the filler employed in a specific implementation of the sealant will also depend on whether more than one type of filler is utilized. Typically, where present, the sealant comprises the filler in an amount of from 0.1 to 95, alternatively from 1 to 60, alternatively from 1 to 20 wt. %, based on the weight of the sealant.

In particular embodiments, the sealant comprises a treating agent. The treating agent is not limited, and may be any treating agent suitable for use in treating (e.g. surface treating) an additive of the sealant, such as the filler and other additives (e.g. physical drying agents, flame retardants, pigments, and/or water release agents) which may be present in the sealant. More specifically, solid and/or particulate additives may be treated with the treating agent before being added to the sealant. Alternatively, or in addition, solid and/or particulate additives may be treated with the treating agent in situ. General examples of suitable treating agents include those comprising an alkoxysilane, an alkoxy-functional oligosiloxane, a cyclic polyorganosiloxane, a hydroxyl-functional oligosiloxane (e.g. dimethyl siloxane or methyl phenyl siloxane), a fatty acid (e.g. a stearate, such as calcium stearate), and the like, as well as combinations thereof. Specific examples of treating agents include alkylthiols, fatty acids, titanates, titanate coupling agents, zirconate coupling agents, and the like, as well as combinations thereof.

In some embodiments, the treating agent is or comprises an organosilicon filler treating agent. Examples of such organosilicon filler treating agents include compositions suitable for treating silica fillers, such as organochlorosilanes, organosiloxanes, organodisilazanes (e.g. hexaalkyl disilazane), and organoalkoxysilanes (e.g. $CH_3Si(OCH_3)_3$, $C_6H_{13}Si(OCH_3)_3$, $C_8H_{17}Si(OC_2H_5)_3$, $C_{10}H_{21}Si(OCH_3)_3$, $C_{12}H_{25}Si(OCH_3)_3$, $C_{14}H_{29}Si(OC_2H_5)_3$, $C_6H_5CH_2CH_2Si(OCH_3)_3$, etc.), and the like. In these or other embodiments, the treating agent is or comprises an alkoxysilane having the formula (X): $R^{10}_A Si(OR^{11})_{4-A}$. In formula (X), subscript A is an integer of from 1 to 3, such as 1, 2, or 3, Each $R^{10}$ is an independently selected monovalent organic group, such as a monovalent hydrocarbon group having from 1 to 50 carbon atoms, alternatively from 8 to 30 carbon atoms, alternatively from 8 to 18 carbon atoms, alternatively from 1 to 5 carbon atoms. $R^{10}$ may be saturated or unsaturated, and branched or unbranched. Alternatively, $R^{10}$ may be saturated and unbranched. $R^{10}$ is exemplified by alkyl groups such as methyl, ethyl, hexyl, octyl, dodecyl, tetradecyl, hexadecyl, and octadecyl; alkenyl groups such as vinyl; and aromatic groups such as benzyl and phenylethyl. Each $R^{11}$ is an independently selected saturated hydrocarbon group having from 1 to 4 carbon atoms, alternatively from 1 to 2 carbon atoms. Specific examples of organosilicon filler treating agents also include hexyltrimethoxysilane, octyltriethoxysilane, decyltrimethoxysilane, dodecyltrimethoxysilane, tetradecyltrimethoxysilane, phenylethyltrimethoxysilane, octadecyltrimethoxysilane, octadecyltriethoxysilane, and combinations thereof.

In some embodiments, the treating agent is or comprises an alkoxy-functional oligosiloxanes. Examples of suitable alkoxy-functional oligosiloxanes include those having the general formula (XI): $(R^{12}O)_B Si(OSiR^{13}_2 R^{14})_{(4-B)}$. In formula (XI), subscript B is 1, 2 or 3. In specific embodiments, subscript B is 3. Each $R^{12}$ is an independently selected alkyl group. Each $R^{13}$ is an independently selected unsaturated monovalent hydrocarbon group having from 1 to 10 carbon atoms. Each $R^{14}$ is an independently selected unsaturated monovalent hydrocarbon group having at least 10 carbon atoms.

In certain embodiments, the treating agent is or comprises a polyorganosiloxane capable of hydrogen bonding. Such treating agents utilize multiple hydrogen bonds, which are clustered and/or dispersed, as a means to tether a compatibilization moiety to a surface of the sealant component to be treated (e.g. the filler). Suitable polyorganosiloxanes capable of hydrogen bonding have an average, per molecule, of at least one silicon-bonded group capable of hydrogen bonding, which is typically selected from organic groups having multiple hydroxyl functionalities, organic groups having at least one amino functional group, and combinations thereof. In other words, the polyorganosiloxane capable of hydrogen bonding typically utilizes hydrogen bonding as a primary mode of attachment to the filler. As such, in some embodiments, the polyorganosiloxane is incapable of forming covalent bonds with the filler. The polyorganosiloxane may be free of condensable silyl groups (e.g. silicon bonded alkoxy groups, silazanes, and silanols). Examples of suitable polyorganosiloxanes for use in or as the sealant include saccharide-siloxane polymers, amino-functional polyorganosiloxanes, and a combination thereof. In specific embodiments, the sealant comprises a polyorganosiloxane comprising a saccharide-siloxane polymer.

The amount of the treating agent present in the sealant depends on various factors (e.g. the amount and/or type of the (I) copolymer, the types and/or amounts of any additional materials present in the sealant (such as those treated with the treating agent), etc.), and may be readily determined by one of skill in the art. Typically, the amount of the treating agent varies depending on the type of treating agent selected, the type and/or amount of particulates to be treated, and whether the particulates are treated before being added to the sealant or in situ. Typically, where present, the sealant comprises the treating agent in an amount of from 0.01 to 20, alternatively from 0.1 to 15, alternatively from 0.5 to 5 wt. %, based on the weight of the sealant.

In some embodiments, the sealant comprises a polymer additive, such as crosslinkers, chain extenders, plasticizers, end-blockers, and the like, or combinations thereof. In general, suitable polymer additives include compounds having functional groups that are reactive with functional groups present in the (I) copolymer of the sealant, or with functional groups present in another polymer additive that has been reacted therewith. Certain polymer additives may be named based on an intended function (e.g. to cross-link, to chain-extend, to end-block, etc.). However, it is to be appreciated that there may be overlap in functions between types of polymer additives because certain polymer additives described herein may have more than one function as will be readily appreciated by one of skill in the art. For examples, suitable crosslinkers include those comprising a compound having an average, per molecule, of two or more substituents reactive with alkoxy groups present within the (I) copolymer, and suitable chain extenders include those comprising a compound having an average, per molecule, of two substituents reactive with alkoxy groups present within the (I) copolymer or with groups present within another polymer additive reacted with the (I) copolymer. Accordingly, as is understood by those of skill in the art, various compounds may be used as a cross-linker and/or a chain extender. Similarly, various plasticizers, which are exemplified by the particular plasticizers described below, may also be interchangeably utilized in or as a crosslinker and/or a chain extender of the sealant.

In some embodiments, the sealant comprises a crosslinker. Some examples of suitable crosslinkers include silane crosslinkers having hydrolyzable groups, or partial or full hydrolysis products thereof. Examples of such silane crosslinkers include those including a silicon compound having the general formula (XII): $R^{15}{}_C Si(R^{16})_{(4-C)}$, where each $R^{15}$ is an independently selected monovalent hydrocarbon group, such as an alkyl group; each $R^{16}$ is a hydrolyzable substituent, for example, a halogen atom, an acetamido group, an acyloxy group such as acetoxy, an alkoxy group, an amido group, an amino group, an aminoxy group, a hydroxyl group, an oximo group, a ketoximo group, or a methylacetamido group; and subscript C is 0-3, such as 0, 1, 2, or 3. Typically, subscript C has an average value greater than 2. Alternatively, subscript C may have a value ranging from 3 to 4. Typically, each $R^{16}$ is independently selected from hydroxyl, alkoxy, acetoxy, amide, or oxime. Specific examples of suitable silane crosslinkers include methyldiacetoxymethoxysilane, methylacetoxydimethoxysilane, vinyldiacetoxymethoxysilane, vinylacetoxydimethoxysilane, methyldiacetoxyethoxysilane, metylacetoxydiethoxysilane, and combinations thereof.

In some embodiments, the crosslinker includes an acyloxysilane, an alkoxysilane, a ketoximosilane, an oximosilane, or the like, or combinations thereof.

Examples of suitable acetoxysilane crosslinkers include tetraacetoxysilanes, organotriacetoxysilanes, diorganodiacetoxysilanes, and combinations thereof. The acetoxysilane may contain alkyl groups such as methyl, ethyl, propyl, isopropyl, butyl, and tertiary butyl; alkenyl groups such as vinyl, allyl, or hexenyl; aryl groups such as phenyl, tolyl, or xylyl; aralkyl groups such as benzyl or 2-phenylethyl; and fluorinated alkyl groups such as 3,3,3-trifluoropropyl. Exemplary acetoxysilanes include tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyl diacetoxysilane, tetraacetoxysilane, and combinations thereof. In some embodiments, the crosslinker comprises organotriacetoxysilanes, for example mixtures comprising methyltriacetoxysilane and ethyltriacetoxysilane.

Examples of suitable aminofunctional alkoxysilanes suitable for use in or as the crosslinker are exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and combinations thereof.

Examples of suitable oximosilane crosslinkers include alkyltrioximosilanes such as methyltrioximosilane, ethyltrioximosilane, propyltrioximosilane, and butyltrioximosilane; alkoxytrioximosilanes such as methoxytrioximosilane, ethoxytrioximosilane, and propoxytrioximosilane; or alkenyltrioximosilanes such as propenyltrioximosilane or butenyltrioximosilane; alkenyloximosilanes such as vinyloximosilane; alkenylalkyldioximosilanes such as vinyl methyl dioximosilane, vinyl ethyldioximosilane, vinyl methyldioximosilane, or vinylethyldioximosilane; or combinations thereof.

Examples of suitable ketoximosilanes crosslinkers include methyl tris(dimethylketoximo)silane, methyl tris(methylethylketoximo)silane, methyl tris(methylpropylketoximo)silane, methyl tris(methylisobutylketoximo)silane, ethyl tris(dimethylketoximo)silane, ethyl tris(methylethylketoximo)silane, ethyl tris(methylpropylketoximo)silane, ethyl tris(methylisobutylketoximo)silane, vinyl tris(dimethylketoximo)silane, vinyl tris(methylethylketoximo)silane, vinyl tris(methylpropylketoximo)silane, vinyl tris(methylisobutylketoximo)silane, tetrakis(dimethylketoximo)silane, tetrakis(methylethylketoximo)silane, tetrakis(methylpropylketoximo)silane, tetrakis(methylisobutylketoximo)silane, methylbis(dimethylketoximo)silane, methylbis(cyclohexylketoximo)silane, triethoxy(ethylmethylketoxime)silane, diethoxydi(ethylmethylketoxime)silane, ethoxytri(ethylmethylketoxime)silane, methylvinylbis(methylisobutylketoximo)silane, or a combination thereof.

In certain embodiments, the crosslinker comprises an alkoxysilane exemplified by a dialkoxysilane, such as a dialkyldialkoxysilane; a trialkoxysilane, such as an alkyltrialkoxysilane; a tetraalkoxysilane; partial or full hydrolysis products thereof; or a combination thereof. Examples of suitable trialkoxysilanes include methyltrimethoxysilane, vinyltrimethoxysilane, methyltriethoxysilane, ethyltrimethoxysilane, ethyltriethoxysilane, isobutyltrimethoxysilane, isobutyltriethoxysilane, and combinations thereof. Examples of suitable tetraalkoxysilanes include tetraethoxysilane. In specific embodiments, the crosslinker comprises, alternatively is, methyltrimethoxysilane.

In certain embodiments, the crosslinker is polymeric. For example, the crosslinker may comprise a disilane such as bis(triethoxysilyl)hexane, 1,4-bis[trimethoxysilyl(ethyl)]benzene, bis[3-(triethoxysilyl)propyl] tetrasulfide, bis(trimethoxysilyl)hexane), bis(triethoxysilyl)ethane, bis(trimethoxysilyl)ethane, and combinations thereof. In these or other embodiments, the crosslinker may be one single crosslinker or a combination comprising two or more crosslinkers that differ from one another, e.g. based on hydrolyzable substituents and other organic groups bonded to silicon, and, when a polymeric crosslinker is used, siloxane units, structure, molecular weight, sequence, etc.

The amount of the crosslinker present in the sealant depends on various factors (e.g. the amount and/or type of the (I) copolymer, the types and/or amounts of any additional materials present in the sealant (such as other polymer additives), the type of crosslinker utilized, etc.), and may be readily determined by one of skill in the art. In general, where present, the sealant comprises the crosslinker in an amount of from 0.5 to 15, alternatively from 1 to 10, alternatively from 3 to 10 wt. %, based on the weight of the (I) copolymer.

In some embodiments, the sealant comprises a plasticizer. Examples of suitable plasticizers include organic plasticizers, such as those comprising a carboxylic acid ester (e.g. esters), a phthalate (e.g. phthalates), a carboxylate (e.g. carboxylates), an adipate (e.g. adipates), or a combination thereof. Specific examples of suitable organic plasticizers include bis(2-ethylhexyl)terephthalate, bis(2-ethylhexyl)-1, 4-benzenedicarboxylate, 2-ethylhexyl methyl-1,4-benzenedicarboxylate, 1,2 cyclohexanedicarboxylic acid, dinonyl ester (branched and linear), bis(2-propylheptyl) phthalate, diisononyl adipate, and combinations thereof.

In certain embodiments, the plasticizer is an ester having an average, per molecule, of at least one group of formula:

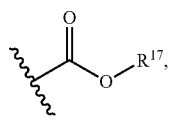

where $R^{17}$ represents a hydrogen atom or a monovalent organic group (e.g. a branched or linear monovalent hydrocarbon group, such as an alkyl group of 4 to 15 carbon atoms, alternatively 9 to 12 carbon atoms). In these or other embodiments, the plasticizer has an average, per molecule, of at least two groups of the formula above each bonded to carbon atoms in a cyclic hydrocarbon. In such instances, the plasticizer may have general formula:

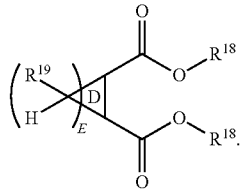

In this formula, D is a carbocyclic group having 3 or more carbon atoms, alternatively 3 to 15 carbon atoms, which may be unsaturated, saturated, or aromatic. Subscript E is from 1 to 12. Each $R^{18}$ is independently a branched or linear monovalent hydrocarbon group, such as an alkyl group of 4 to 15 carbon atoms (e.g. an alkyl group such as methyl, ethyl, butyl, etc.). Each $R^{19}$ is independently a hydrogen atom or a branched or linear, substituted or unsubstituted, monovalent organic group. For example, in some embodiments, at least one $R^{19}$ is a moiety comprising an ester functional group.

In specific embodiments, the sealant comprises a polymeric plasticizer. Examples of polymeric plasticizers include alkenyl polymers (e.g. those obtained by polymerizing vinyl or allyl monomers via various methods); polyalkylene glycol esters (e.g. diethylene glycol dibenzoates, triethylene glycols, dibenzoate pentaerythritol esters, etc.); polyester plasticizers (e.g. those obtained from dibasic acids such as sebacic acid, adipic acid, azelaic acid, phthalic acid, etc. and dihydric alcohols such as ethylene glycol, diethylene glycol, triethylene glycol, propylene glycol, dipropylene glycol, etc.); polyesters including polyester polyols each having a molecular weight of not less than 500 (e.g. polyethylene glycols, polypropylene glycols, polytetramethylene glycols, etc.); polystyrenes (e.g. polystyrene, poly-alpha-methylstyrene, etc.); polybutenes and polybutadienes (e.g. polyisobutylene, butadiene acrylonitrile, etc.); and polychloroprenes. In various embodiments, a low molecular weight plasticizer and a higher molecular weight polymeric plasticizer may present in the sealant in combination.

Specific plasticizers are known in the art and are commercially available. Such plasticizers may be present in the sealant alone or in combination. For example, the plasticizer may comprise a phthalate, such as: a dialkyl phthalate such as dibutyl phthalate (Eastman™ DBP Plasticizer), diheptyl phthalate, diisononyl phthalate, di(2-ethylhexyl) phthalate, or diisodecyl phthalate (DIDP), bis(2-propylheptyl) phthalate (BASF Palatinol® DPHP), di(2-ethylhexyl) phthalate (Eastman™ DOP Plasticizer), dimethyl phthalate (Eastman™ DMP Plasticizer); diethyl phthalate (Eastman™ DMP Plasticizer); butyl benzyl phthalate, and bis(2-ethylhexyl)terephthalate (Eastman™ 425 Plasticizer); a dicarboxylate such as Benzyl, C7-C9 linear and branched alkyl esters, 1, 2, benzene dicarboxylic acid (Ferro SANTICIZER® 261A), 1,2,4-benzenetricarboxylic acid (BASF Palatinol® TOTM-I), bis(2-ethylhexyl)-1,4-benzenedicarboxylate (Eastman™ 168 Plasticizer); 2-ethylhexyl methyl-1,4-benzenedicarboxylate; 1,2 cyclohexanedicarboxylic acid, dinonyl ester, branched and linear (BASF Hexamoll®DINCH); diisononyl adipate; trimellitates such as trioctyl trimellitate (Eastman™ TOTM Plasticizer); triethylene glycol bis(2-ethylhexanoate) (Eastman™ TEG-EH Plasticizer); triacetin (Eastman™ Triacetin); nonaromatic dibasic acid esters such as dioctyl adipate, bis(2-ethylhexyl) adipate (Eastman™ DOA Plasticizer and Eastman™ DOA Plasticizer, Kosher), di-2-ethylhexyladipate (BASF Plastomoll® DOA), dioctyl sebacate, dibutyl sebacate and diisodecyl succinate; aliphatic esters such as butyl oleate and methyl acetyl recinolate; phosphates such as tricresyl phosphate and tributyl phosphate; chlorinated paraffins; hydrocarbon oils such as alkyldiphenyls and partially hydrogenated terphenyls; process oils; epoxy plasticizers such as epoxidized soybean oil and benzyl epoxystearate; tris(2-ethylhexyl)ester; a fatty acid ester; and a combination thereof. Examples of other suitable plasticizers and their commercial sources include BASF Palamoll® 652 and Eastman 168 Xtreme™ Plasticizer.

The amount of the plasticizer present in the sealant depends on various factors (e.g. the amount and/or type of the (I) copolymer, the types and/or amounts of any additional materials present in the sealant (such as other polymer additives), the type of crosslinker utilized, etc.), and may be readily determined by one of skill in the art. In general, where present, the sealant comprises the plasticizer in an amount of from 5 to 150 parts by weight based on the combined weights of all components in the sealant. In specific embodiments, the sealant comprises the plasticizer in an amount of from 0.1 to 10 wt. % based on the total weight of the sealant.

In some embodiments, the sealant comprises an extender. Examples of suitable extenders include non-functional polyorganosiloxanes, such as those comprising difunctional units of the formula $R^{20}_2SiO_{2/2}$ and terminal units of the formula $R^{21}_3SiD'$-, where each $R^{20}$ and each $R^{21}$ are independently a monovalent organic group such as a monovalent hydrocarbon group exemplified by alkyl such as methyl, ethyl, propyl, and butyl; alkenyl such as vinyl, allyl, and hexenyl; aryl such as phenyl, tolyl, xylyl, and naphthyl; and aralkyl groups such as phenylethyl; and D' is an oxygen atom or a divalent group. Non-functional polyorganosiloxanes are known in the art and are commercially available. Suitable non-functional polyorganosiloxanes are exemplified by, but not limited to, polydimethylsiloxanes. Such polydimethylsiloxanes include DOWSIL® 200 Fluids, which are commercially available from Dow Silicones Corporation of Midland, Mich., U.S.A. and may have viscosity ranging from $5\times10^{-5}$ to 0.1, alternatively from $5\times10^{-5}$ to 0.05, and alternatively from 0.0125 to 0.06, $m^2/s$. The amount of the extender present in the sealant depends on various factors (e.g. the amount and/or type of the (I) copolymer, the types and/or amounts of any additional materials present in the sealant (such as other polymer additives), the type of crosslinker utilized, etc.), and may be readily determined by one of skill in the art. In general, where present, the sealant comprises the extender in an amount of from 0.1 to 10 wt. % based on the total weight of the sealant.

In some embodiments, the sealant comprises an end-blocker. Suitable end-blockers comprise an M unit, i.e., a siloxane unit of formula $R^{22}_3SiO_{1/2}$, where each $R^{22}$ independently represents a monovalent organic group, such as a monovalent hydrocarbon group. General examples of such end-blockers include those comprising a polyorganosiloxane (e.g. a polydiorganosiloxane, such as a polydimethylsiloxane) that is end-blocked at one terminus by a triorganosilyl group, e.g. $(CH_3)_3SiO$—, and at another terminus by a hydroxyl group. Other examples of suitable end-blockers include polydiorganosiloxanes having both hydroxyl end groups and triorganosilyl end groups, such as those having more than 50%, alternatively more than 75%, of the total end groups as hydroxyl groups. The amount of triorganosilyl group present in such end-blockers may vary, and is typically used to regulate the modulus of the reaction product prepared by condensation reaction of the sealant. Without wishing to be bound by theory, it is thought that higher concentrations of triorganosilyl end groups may provide a lower modulus in certain cured products. In some embodiments, the end-blocker of the sealant comprises a single end-blocking compound. However, in other embodiments, the end-blocker of sealant comprises two or more different end-blocking compounds that differ from one another, e.g. by way of properties including structure, viscosity, average molecular weight, polymer units, sequence, etc., or combinations thereof. The amount of the end-blocker present in the sealant depends on various factors (e.g. the amount and/or type of the (I) copolymer, the types and/or amounts of any additional materials present in the sealant (such as other polymer additives), the type of end-blocker utilized, etc.), and may be readily determined by one of skill in the art. In general, where present, the sealant comprises the end-blocker in an amount of from 0 to 50, alternatively from 0 to 30, alternatively from 0 to 15, wt. %, based on the total weight of the (I) copolymer.

In certain embodiments, the sealant comprises a surface modifier. Suitable surface modifiers include adhesion promoters, release agents, and the like, as well as combinations thereof. Typically, the surface modifier is utilized to change the appearance of the surface of a reaction product of the sealant. For example, the surface modifier may be used to increase gloss of the surface of such a reaction product. Specific examples of suitable surface modifiers include polydiorganosiloxanes with alkyl and aryl groups. For example, DOWSIL® 550 Fluid is a trimethylsiloxy-terminated poly(dimethyl/methylphenyl)siloxane with a viscosity of 0.000125 $m^2/s$ that is commercially available from Dow Silicones Corporation. These and other examples of suitable surface modifiers include natural oils (e.g. those obtained from a plant or animal source), such as linseed oil, tung oil, soybean oil, castor oil, fish oil, hempseed oil, cottonseed oil, oiticica oil, rapeseed oil, and the like, as well as combinations thereof.

In some embodiments, the surface modifier is an adhesion promoter. Suitable adhesion promoters may comprise a hydrocarbonoxysilane such as an alkoxysilane, a combination of an alkoxysilane and a hydroxy-functional polyorganosiloxane, an amino functional silane, an epoxy functional silane, a mercaptofunctional silane, or a combination thereof. Adhesion promoters are known in the art and may comprise silanes having the formula $R^{23}_F R^{24}_G Si(OR^{25})_{4-(F+G)}$ where each $R^{23}$ is independently a monovalent organic group having at least 3 carbon atoms; $R^{24}$ contains at least one SiC bonded substituent having an adhesion-promoting group, such as amino, epoxy, mercapto or acrylate groups; each $R^{25}$ is independently a monovalent organic group (e.g. methyl, ethyl, propyl, butyl, etc.); subscript F has a value ranging from 0 to 2; subscript G is either 1 or 2; and the sum of (F+G) is not greater than 3. In certain embodiments, the adhesion promoter comprises a partial condensate of the above silane. In these or other embodiments, the adhesion promoter comprises a combination of an alkoxysilane and a hydroxy-functional polyorganosiloxane.

In some embodiments, the adhesion promoter comprises an unsaturated or epoxy-functional compound. In such embodiments, the adhesion promoter may be or comprise an unsaturated or epoxy-functional alkoxysilane such as those having the formula (XIII): $R^{26}_H Si(OR^{27})_{(4-H)}$, where subscript H is 1, 2, or 3, alternatively subscript H is 1. Each $R^{26}$ is independently a monovalent organic group with the proviso that at least one $R^{26}$ is an unsaturated organic group or an epoxy-functional organic group. Epoxy-functional organic groups for $R^{26}$ are exemplified by 3-glycidoxypropyl and (epoxycyclohexyl)ethyl. Unsaturated organic groups for $R^{26}$ are exemplified by 3-methacryloyloxypropyl, 3-acryloyloxypropyl, and unsaturated monovalent hydrocarbon groups such as vinyl, allyl, hexenyl, undecylenyl. Each $R^{27}$ is independently a saturated hydrocarbon group of 1 to 4 carbon atoms, alternatively 1 to 2 carbon atoms. $R^{27}$ is exemplified by methyl, ethyl, propyl, and butyl.

Specific examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

In some embodiments, the adhesion promoter comprises an epoxy-functional siloxane, such as a reaction product of a hydroxy-terminated polyorganosiloxane with an epoxy-functional alkoxysilane (e.g. such as one of those described above), or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

In certain embodiments, the adhesion promoter comprises an aminofunctional silane, such as an aminofunctional alkoxysilane exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, N-(3-(trimethoxysilyl)propyl) ethylenediamine, and the like, as well as combinations thereof. In these or other embodiments, the adhesion promoter comprises a mercaptofunctional alkoxysilane, such as 3-mercaptopropyltrimethoxysilane or 3-mercaptopropyltriethoxysilane.

Additional examples of surface modifiers include adhesion promoters which are the reaction product of an epoxy-alkylalkoxysilane, such as 3-glycidoxypropyltrimethoxysilane, and an amino-substituted alkoxysilane, such as 3-aminopropyltrimethoxysilane, optionally with an alkylalkoxysilane, such as methyltrimethoxysilane.

In some embodiments, the surface modifier comprises, alternatively is, a release agent. Suitable release agents are exemplified by fluorinated compounds, such as fluoro-functional silicones, or fluoro-functional organic compounds. In specific embodiments, the sealant comprises multiple surface modifiers, such as one or more adhesion promoters, one or more release agents, one or more natural oils, or combinations thereof.

The amount of the surface modifier present in the sealant depends on various factors (e.g. the amount and/or type of the (I) copolymer, the types and/or amounts of any additional materials present in the sealant, curing conditions to which the sealant is intended to be exposed, etc.), and may be readily determined by one of skill in the art. In general, where present, the sealant comprises the surface modifier in an amount of from 0.01 to 50, alternatively from 0.01 to 10, alternatively from 0.01 to 5 parts by weight, based on the combined weights of all components in the sealant.

In certain embodiments, the sealant comprises a drying agent, such as physical drying agents (e.g. adsorbents), chemical drying agents, etc. In general, the drying agent binds water and low-molecular weight alcohol from various sources. For example, the drying agent may bind by-products of a condensation reaction involving the (1) copolymer, such as water and alcohols. Physical drying agents typically trap and/or adsorb such water and/or by-products, where chemical drying agents typically binding the water and/or other by-products by chemical means (e.g. via covalent bonding). Examples of suitable drying agents for use in the sealant include adsorbents, such as those comprising inorganic particulates.

Such adsorbents typically have a particle size of 10 micrometers or less, alternatively 5 micrometers or less, and an average pore size sufficient to adsorb water and low-molecular weight alcohol alcohols (e.g. an average pore size of 10 Å (Angstroms) or less, alternatively 5 Å or less, alternatively 3 Å or less). Specific examples of such adsorbents include zeolites (e.g. chabasite, mordenite, and analcite) and molecular sieves comprising alkali metal alumino silicates, silica gel, silica-magnesia gel, activated carbon, activated alumina, calcium oxide, and combinations thereof. Examples of commercially available drying agents include dry molecular sieves, such as 3 Å (Angstrom) molecular sieves sold under the trademark SYLOSIV® by Grace Davidson and under the trade name PURMOL by Zeochem of Louisville, Ky., U.S.A., and 4 Å molecular sieves sold under the trade name Doucil zeolite 4A by Ineos Silicas of Warrington, England. Other examples of suitable drying agents include: MOLSIV ADSORBENT TYPE 13X, 3A, 4A, and 5A molecular sieves, all of which are commercially available from UOP of Illinois, U.S.A.; SILIPORITE NK 30AP and 65xP molecular sieves from Atofina of Philadelphia, Pa., U.S.A.; and molecular sieves available from W.R. Grace of Maryland, U.S.A. under various names. Examples of chemical drying agents include silanes, such as those described above with respect to the crosslinker. For example, alkoxysilanes suitable as drying agents include vinyltrimethoxysilane, vinyltriethoxysilane, and combinations thereof. As understood by those of skill in the art, the chemical drying agent may be added to the sealant, or to a part of the sealant (e.g. where the sealant is a multiple-part composition) to keep the sealant or part thereof free from water. As such, the drying agent may be added to a part (e.g. a dry part) of the sealant prior to the sealant being formed, thereby rendering the part shelf stable. Alternatively, or additionally, the drying agent may keep the sealant free from water after formulation (e.g. after the parts of the sealant are combined/mixed together). The amount of the drying agent present in the sealant depends on various factors (e.g. the amount and/or type of the (I) copolymer, the types and/or amounts of any additional materials present in the sealant, curing conditions to which the sealant is intended to be exposed, etc.), and may be readily determined by one of skill in the art. In general, where present, the sealant comprises the drying agent in an amount of from 0.1 to 5 parts by weight, based on the combined weights of all components in the sealant.

In some embodiments, the sealant comprises a biocide. General examples of suitable biocides include fungicides, herbicides, pesticides, antimicrobials, and the like, as well as combinations thereof. For example, in certain embodiments, the biocide comprises, alternatively is, a fungicide. Specific examples of the fungicide include N-substituted benzimidazole carbamates and benzimidazolyl carbamates, such as methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]}carbamate, methyl N-{2-[1-(N-methylcarbamoyl)-5-methylbenzimidazolyl]}carbamate, ethyl N-{2-[1-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]}carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]}carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]}carbamate, ethoxyethyl N-{2-[1-(N-propylcarbamoyl)benzimidazolyl]}carbamate, ethoxyethyl N-{2-[1-(N-butylcarbamoyl)benzimidazolyl]}carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy)benzoimidazolyl]}carbamate, ethoxyethyl N-{2-[1-(N-propylcarbamoyl)benzimidazolyl]}carbamate, ethoxyethyl N-{2-[1-(N-butylcarbamoyloxy)benzoimidazolyl]}carbamate, methyl N-{2-[1-(N,N-dimethylcarbamoyl)-6-chlorobenzimidazolyl]}carbamate, and methyl N-{2-[1-(N,N-dimethylcarbamoyl)-6-nitrobenzimidazolyl]}carbamate; 10,10'-oxybisphenoxarsine (trade name: Vinyzene, OBPA); di-iodomethyl-para-tolylsulfone; benzothiophene-2-cyclohexylcarboxamide-S,S-dioxide; N-(fluordichloridemethylthio)phthalimide (trade names: Fluor-Folper, Preventol A3); methyl-benzimideazol-2-ylcarbamate (trade names: Carbendazim, Preventol BCM); Zinc-bis(2-pyridylthio-1-oxide); zinc pyrithione; 2-(4-thiazolyl)-benzimidazol; N-phenyl-iodpropargylcarbamate; N-octyl-4-isothiazolin-3-on; 4,5-dichloride-2-n-octyl-4-isothiazolin-3-on; N-butyl-1,2-benzisothiazolin-3-on; triazolyl-compounds, such as tebuconazol; and the like, as well as combinations thereof. In particular embodiments, such fungicides are utilized in combination with one or more inorganic materials, such as mineral (e.g. zeolites), metals (e.g. copper, silver, platinum, etc.), and combinations thereof.

In particular embodiments, the biocide comprises, alternatively is, an herbicide. Specific examples of the herbicide include amide herbicides such as allidochlor N,N-diallyl-2-chloroacetamide; CDEA 2-chloro-N,N-diethylacetamide; etnipromid (RS)-2-[5-(2,4-dichlorophenoxy)-2-nitrophenoxy]-N-ethylpropionamide; anilide herbicides such as cisanilide cis-2,5-dimethylpyrrolidine-1-carboxanilide; flufenacet 4'-fluoro-N-isopropyl-2-[5-(trifluoromethyl)-1,3,4-thiadiazol-2-yloxy]acetanilide; napropanilide (RS)-α-2-naphthoxypropionanilide; arylalanine herbicides such as benzoylprop N-benzoyl-N-(3,4-dichlorophenyl)-DL-alanine; flamprop-M N-benzoyl-N-(3-chloro-4-fluorophenyl)-D-alanine; chloroacetanilide herbicides such as butachlor N-butoxy methyl-2-chloro-2',6'-diethylacetanilide; metazachlor 2-chloro-N-(pyrazol-1-ylmethyl)acet-2',6'-xylidide; prynachlor (RS)-2-chloro-N-(1-methylprop-2-ynyl)acetanilide; sulphonanilide herbicides such as cloransulam 3-chloro-2-(5-ethoxy-7-fluoro[1,2,4]triazolo[1,5-c]pyrimidin-2-ylsulphonamido)benzoic acid; metosulam 2',6'-dichloro-5,7-dimethoxy-3'-methyl[1,2,4]triazolo[1,5-a]pyrimidine-2-sulphonanilide; antibiotic herbicides such as bilanafos 4-[hydroxy(methyl)phosphinoyl]-L-homoalanyl-L-alanyl-L-alanine; benzoic acid herbicides such as chloramben 3-amino-2,5-dichlorobenzoic acid; 2,3,6-TBA 2,3,6-trichlorobenzoic acid; pyrimidinyloxybenzoic acid herbicides such as bispyribac 2,6-bis(4,6-dimethoxypyrimidin-2-yloxy)benzoic acid; pyrimidinylthiobenzoic acid herbicides such as pyrithiobac 2-chloro-6-(4,6-dimethoxypyrimidin-2-ylthio)benzoic acid; phthalic acid herbicides such as chlorthal tetrachloroterephthalic acid; picolinic acid herbicides such as aminopyralid 4-amino-3,6-dichloropyridine-2-carboxylic acid; quinolinecarboxylic acid herbicides such as quinclorac 3,7-dichloroquinoline-8-carboxylic acid; arsenical herbicides such as CMA calcium bis(hydrogen methylarsonate); MAMA ammonium hydrogen methylarsonate; sodium arsenite; benzoylcyclohexanedione herbicides such as mesotrione 2-(4-mesyl-2-nitrobenzoyl)cyclohexane-1,3-dione; benzofuranyl alkylsulphonate herbicides such as benfuresate 2,3-dihydro-3,3-dimethylbenzofuran-5-yl ethanesulphonate; carbamate herbicides such as carboxazole methyl 5-tert-butyl-1,2-oxazol-3-ylcarbamate; fenasulam methyl 4-[2-(4-chloro-o-tolyloxy)acetamido]phenylsulphonylcarbamate; carbanilate herbicides such as BCPC (RS)-sec-butyl 3-chlorocarbanilate; desmedipham ethyl 3-phenylcarbamoyloxyphenylcarbamate; swep methyl 3,4-dichlorocarbanilate; cyclohexene oxime herbicides such as butroxydim (RS)-(EZ)-5-(3-butyryl-2,4,6-trimethylphenyl)-2-(1-ethoxyiminopropyl)-3-hydroxycyclohex-2-en-1-one; tepraloxydim (RS)-(EZ)-2-{1-[(2E)-3-chloroallyloxyimino]propyl}-3-hydroxy-5-perhydropyran-4-ylcyclohex-2-en-1-one; cyclopropylisoxazole herbicides such as isoxachlortole 4-chloro-2-mesylphenyl 5-cyclopropyl-1,2-oxazol-4-yl ketone; dicarboximide herbicides such as flumezin 2-methyl-4-(α,α,α-trifluoro-m-tolyl)-1,2,4-oxadiazinane-3,5-dione; dinitroaniline herbicides such as ethalfluralin N-ethyl-α,α,α-trifluoro-N-(2-methylallyl)-2,6-dinitro-p-toluidine; prodiamine 5-dipropylamino-α,α,α-trifluoro-4,6-dinitro-o-toluidine; dinitrophenol herbicides such as dinoprop 4,6-dinitro-o-cymen-3-ol; etinofen α-ethoxy-4,6-dinitro-o-cresol; diphenyl ether herbicides such as ethoxyfen O-[2-chloro-5-(2-chloro-α,α,α-trifluoro-p-tolyloxy)benzoyl]-L-lactic acid; nitrophenyl ether herbicides such as aclonifen 2-chloro-6-nitro-3-phenoxyaniline; nitrofen 2,4-dichlorophenyl 4-nitrophenyl ether; dithiocarbamate herbicides such as dazomet 3,5-dimethyl-1,3,5-thiadiazinane-2-thione; halogenated aliphatic herbicides such as dalapon 2,2-dichloropropionic acid; chloroacetic acid; imidazolinone herbicides such as imazapyr (RS)-2-(4-isopropyl-4-methyl-5-oxo-2-imidazolin-2-yl)nicotinic acid; inorganic herbicides such as disodium tetraborate decahydrate; sodium azide; nitrile herbicides such as chloroxynil 3,5-dichloro-4-hydroxybenzonitrile; ioxynil 4-hydroxy-3,5-diiodobenzonitrile; organophosphorus herbicides such as anilofos S-4-chloro-N-isopropylcarbaniloylmethyl O,O-dimethyl phosphorodithioate; glufosinate 4-[hydroxy(methyl)phosphinoyl]-DL-homoalanine; phenoxy herbicides such as clomeprop (RS)-2-(2,4-dichloro-m-tolyloxy)propionanilide; fenteracol 2-(2,4,5-trichlorophenoxy)ethanol; phenoxyacetic herbicides such as MCPA (4-chloro-2-methylphenoxy)acetic acid; phenoxybutyric herbicides such as MCPB 4-(4-chloro-o-tolyloxy)butyric acid; phenoxypropionic herbicides such as fenoprop (RS)-2-(2,4,5-trichlorophenoxy) propionic acid; aryloxyphenoxypropionic herbicides such as isoxapyrifop (RS)-2-[2-[4-(3,5-dichloro-2-pyridyloxy)phenoxy]propionyl]isoxazolidine; phenylenediamine herbicides such as dinitramine N1,N1-diethyl-2,6-dinitro-4-trifluoromethyl-m-phenylenediamine, pyrazolyloxyacetophenone herbicides such as pyrazoxyfen 2-[4-(2,4-dichlorobenzoyl)-1,3-dimethylpyrazol-5-yloxy]acetophenone; pyrazolylphenyl herbicides such as pyraflufen 2-chloro-5-(4-chloro-5-difluoromethoxy-1-methylpyrazol-3-yl)-4-fluorophenoxyacetic acid; pyridazine herbicides such as pyridafol 6-chloro-3-phenylpyridazin-4-ol; pyridazinone herbicides such as chloridazon 5-amino-4-chloro-2-phenylpyridazin-3(2H)-one; oxapyrazon 5-bromo-1,6-dihydro-6-oxo-1-phenylpyridazin-4-yloxamic acid; pyridine herbicides such as fluoroxypyr 4-amino-3,5-dichloro-6-fluoro-2-pyridyloxyacetic acid; thiazopyr methyl 2-difluoromethyl-5-(4,5-dihydro-1,3-thiazol-2-yl)-4-isobutyl-6-trifluoromethylnicotinate; pyrimidinediamine herbicides such as iprymidam 6-chloro-N4-isopropylpyrimidine-2,4-diamine; quaternary ammonium herbicides such as diethamquat 1,1'-bis(diethylcarbamoylmethyl)-4,4'-bipyridinium; paraquat 1,1'-dimethyl-4,4'-bipyridinium; thiocarbamate herbicides such as cycloate S-ethyl cyclohexyl(ethyl)thiocarbamate; tiocarbazil S-benzyl di-sec-butylthiocarbamate; thiocarbonate herbicides such as EXD O,O-diethyl dithiobis(thioformate); thiourea herbicides such as methiuron 1,1-dimethyl-3-m-tolyl-2-thiourea; triazine herbicides such as triaziflam (RS)-N-[2-(3,5-dimethylphenoxy)-1-methylethyl]-6-(1-fluoro-1-methylethyl)-1,3,5-triazine-2,4-diamine; chlorotriazine herbicides such as cyprazine 6-chloro-N2-cyclopropyl-N4-isopropyl-1,3,5-triazine-2,4-diamine; propazine 6-chloro-A2,N4-di-isopropyl-1,3,5-triazine-2,4-diamine; methoxytriazine herbicides such as prometon N2,N4-di-isopropyl-6-methoxy-1,3,5-triazine-2,4-diamine; methylthiotriazine herbicides such as cyanatryn 2-(4-ethylamino-6-methylthio-1,3,5-triazin-2-ylamino)-2-methylpropionitrile; triazinone herbicides such as hexazinone 3-cyclohexyl-6-dimethylamino-1-methyl-1,3,5-triazine-2,4(1H,3H)-dione; triazole herbicides such as epronaz N-ethyl-N-propyl-3-propylsulphonyl-1H-1,2,4-triazole-1-carboxamide; triazolone herbicides such as carfentrazone (RS)-2-chloro-3-{2-chloro-5-[4-(difluoromethyl)-4,5-dihydro-3-methyl-5-oxo-1H-1,2,4-triazol-1-yl]-4-fluorophenyl}propionic acid; triazolopyrimidine herbicides such as florasulam 2',6',8-trifluoro-5-methoxy[1,2,4]triazolo[1,5-c]pyrimidine-2-sulphonanilide; uracil herbicides such as flupropacil isopropyl 2-chloro-5-(1,2,3,6-tetrahydro-3-methyl-2,6-dioxo-4-trifluoromethylpyrimidin-1-yl)benzoate; urea herbicides such as cycluron 3-cyclo-octyl-1,1-dimethylurea; monisouron 1-(5-tert-butyl-1,2-oxazol-3-yl)-3-methylurea; phenylurea herbicides such as chloroxuron 3-[4-(4-chlorophenoxy)phenyl]-1,1-dimethylurea; siduron 1-(2-methylcyclohexyl)-3-phenylurea; pyrimidinylsulphonylurea herbicides such as flazasulphuron 1-(4,6-dimethoxypyrimidin-2-yl)-3-(3-trifluoromethyl-2-pyridylsulphonyl)urea; pyrazosulphuron 5-[(4,6-dimethoxypyrimidin-2-ylcarbamoyl)sulphamoyl]-1-methylpyrazole-4-carboxylic acid; triazinylsulphonylurea herbicides such as thifensulphuron 3-(4-methoxy-6-methyl-1,3,5-triazin-2-ylcarbamoylsulphamoyl)thiophene-2-carboxylic acid; thiadiazolylurea herbicides such as tebuthiuron 1-(5-tert-butyl-1,3,4-thiadiazol-2-yl)-1,3-dimethylurea; and/or unclassified herbicides such as chlorfenac (2,3,6-trichlorophenyl)acetic acid; methazole 2-(3,4-dichlorophenyl)-4-methyl-1,2,4-oxadiazolidine-3,5-dione; tritac (RS)-1-(2,3,6-trichlorobenzyloxy)propan-2-ol; 2,4-D, chlorimuron, and fenoxaprop; and the like, as well as combinations thereof.

In some embodiments, the biocide comprises, alternatively is, a pesticide. General examples of the pesticide include insect repellents such as N,N-diethyl-meta-toluamide, and pyrethroids such as pyrethrin. Specific examples of the pesticide include atrazine, diazinon, and chlorpyrifos. In these or other embodiments, the biocide comprises, alternatively is, an antimicrobial agent. The type and nature of the antimicrobial agent may vary, and can be readily determined by one of skill in the art. In certain embodiments, the biocide comprises, alternatively is, a boron-containing material, such as a boric anhydride, borax, or a disodium octaborate tetrahydrate. In various embodiments, the sealant comprises two or more biocides, which are each independently selected from the fungicide, herbicide pesticide, antimicrobial, and other biocidal components exemplified herein.

The amount of the biocide present in the sealant depends on various factors (e.g. the type of biocide(s) utilized, the amount and/or type of the (I) copolymer, an intended use of the sealant, curing conditions to which the sealant is intended to be exposed, etc.), and may be readily determined by one of skill in the art. In general, where present, the sealant comprises the biocide, or a combination of biocides, in an amount of from 0.01 to 10, alternatively from 0.1 to 5 wt. % based on the total weight of the sealant.

In particular embodiments, the sealant comprises a flame retardant. Examples of suitable flame retardants include organic/carbonaceous flame retardants (e.g. carbon black, etc.), inorganic/mineral-based flame retardants (e.g. hydrated aluminum hydroxide, silicates such as wollastonite, metal complexes of platinum and/or platinum, etc.) and the like, as well as combinations thereof. Additional examples of suitable flame retardants include halogen-based flame retardants, such as decabromodiphenyloxide, octabromordiphenyl oxide, hexabromocyclododecane, decabromobiphenyl oxide, diphenyoxybenzene, ethylene bis-tetrabromophthalmide, pentabromoethyl benzene, pentabromobenzyl acrylate, tribromophenyl maleic imide, tetrabromobisphenyl A, bis-(tribromophenoxy)ethane, bis-(pentabromophenoxy)ethane, polydibomophenylene oxide, tribromophenylallyl ether, bis-dibromopropyl ether, tetrabromophthalic anhydride, dibromoneopentyl gycol, dibromoethyl dibromocyclohexane, pentabromodiphenyl oxide, tribromostyrene, pentabromochlorocyclohexane, tetrabromoxylene, hexabromocyclododecane, brominated polystyrene, tetradecabromodiphenoxybenzene, trifluoropropene, and PVC; phosphorus based flame-retardants, such as (2,3-dibromopropyl)-phosphate, phosphorus, cyclic phosphates, triaryl phosphates, bis-melaminium pentate, pentaerythritol bicyclic phosphate, dimethylmethylphosphate, phosphine oxide diol, triphenyl phosphate, tris-(2-chloroethyl)phosphate, phosphate esters such as tricreyl-, trixylenyl-, isodecyl diphenyl-, ethylhexyl diphenyl-, trioctyl-, tributyl-, and tris-butoxyethyl phosphate esters, and phosphate salts of various amines (e.g. ammonium phosphate); tetraalkyl lead compounds, such as tetraethyl lead; iron pentacarbonyl; manganese methyl cyclopentadienyl tricarbonyl; melamine and derivatives thereof, such as melamine salts; guanidine; dicyandiamide; ammonium sulphamate; alumina trihydrate; magnesium hydroxide alumina trihydrate; and the like, as well as derivatives, modifications, and combinations thereof. The amount of the flame retardant present in the sealant depends on various factors (e.g. the amount and/or type of the (I) copolymer, an intended use of the sealant, curing conditions to which the sealant is intended to be exposed, a presence/absence of a vehicle/solvent, etc.), and may be readily determined by one of skill in the art. In general, where present, the sealant comprises the flame retardant in an amount of from 0.01 to 15, alternatively from 0.1 to 10 wt. % based on the total weight of the sealant.

In certain embodiments, the sealant comprises a binder. Typically, the binder is a non-reactive, elastomeric, organic polymer, i.e., an elastomeric organic polymer that does not react with the (I) copolymer. Additionally, the binder is typically compatible with the (I) copolymer, i.e., the binder does not form a two-phase system when formulated into the sealant with the (I) copolymer. In general, suitable binders have low gas and moisture permeability, and typically comprise a number average molecular weight (Mn) of from 30,000 to 75,000. However, the binder may comprise a blend of various non-reactive, elastomeric, organic polymers (e.g. of such polymers having a high molecular weight with those having a low molecular weight). In such instances, the higher molecular weight polymer(s) typically comprise a Mn of from 100,000 to 600,000, and the lower molecular weight polymer(s) typically comprise a Mn of from 900 to 10,000, alternatively 900 to 3,000. The value for the lower end of the Mn ranges is typically selected such that the binder is compatible with the (1) copolymer and the other ingredients of the sealant, as understood by those of skill in the art. The binder may comprise or be one non-reactive, elastomeric, organic polymer or, alternatively may comprise two or more non-reactive, elastomeric, organic polymers that differ from one another, e.g. on a basis of structure, viscosity, average molecular weight (Mn or Mw), polymer units, sequence, etc., or combinations thereof.

Examples of suitable binders include polyisobutylenes, which are known in the art and are commercially available. Specific examples of polyisobutylenes include those marketed under the trademark OPPANOL® by BASF Corporation of Germany, as well as the various grades of hydrogenated polyisobutene marketed under the trademark PARLEAM® by NOF Corp. of Japan. Additional examples of suitable polyisobutylenes are commercially available from ExxonMobil Chemical Co. of Baytown, Tex., U.S.A. under the trademark VISTANEX®. These include VISTANEX® MML-80, MML-100, MML-120, and MML-140, which are paraffinic hydrocarbon polymers, composed of long, straight-chain macromolecules containing only chain-end olefinic bonds. VISTANEX® MM polyisobutylenes have a viscosity average molecular weight of from 70,000 to 90,000, and VISTANEX® LM polyisobutylenes (e.g. LM-MS) are lower-molecular weight polyisobutylenes having a viscosity average molecular weight of from 8,700 to 10. Additional examples of polyisobutylenes include VISTANEX LM-MH (viscosity average molecular weight of 10,000 to 11,700); Soltex PB-24 (Mn 950), Indopol® H-100 (Mn 910), Indopol® H-1200 (Mn 2100), from Amoco Corp. of Chicago, Illinois, U.S.A.; NAPVIS® and HYVIS® (e.g. NAPVIS® 200, D10, and DE3; and HYVIS® 200.) from BP Chemicals of London, England. The NAPVIS® polyisobutylenes typically have a Mn of from 900 to 1300. In addition, or as an alternative, to the polyisobutylene(s), the binder may comprise or be a butyl rubber, a styrene-ethylene/butylene-styrene (SEBS) block copolymer, a styrene-ethylene/propylene-styrene (SEPS) block copolymer, polyolefin plastomer, or combinations thereof. SEBS and SEPS block copolymers are known in the art and are commercially available as Kraton® G polymers from Kraton Polymers U.S. LLC of Houston, Tex., U.S.A., and as Septon polymers from Kuraray America, Inc., New York, N.Y., U.S.A. Polyolefin plastomers are also known in the art and are commercially available as AFFINITY® GA 1900 and AFFINITY® GA 1950 compositions from Dow Chemical Company, Elastomers & Specialty Products Division, Midland, Mich., U.S.A.

The amount of the binder present in the sealant depends on various factors (e.g. the amount and/or type of the (I) copolymer, an intended use of the sealant, curing conditions to which the sealant is intended to be exposed, a presence/absence of a vehicle/solvent, etc.), and may be readily determined by one of skill in the art. In general, where present, the sealant comprises the binder in an amount of from 1 to 50, alternatively from 5 to 40, alternatively 5 to 35 parts by weight, based on the combined weights of all components in the sealant.

In some embodiments, the sealant comprises an anti-aging additive. Examples of anti-aging additives include antioxidants, UV absorbers, UV and/or light stabilizers, heat stabilizers, and combinations thereof. The anti-aging additive may be or comprise but one anti-aging additive or, alternatively, may comprise two or more different anti-aging additives. Moreover, one particular anti-aging additive may serve multiple functions (e.g. as both a UV absorber and a UV stabilizer, as both an antioxidant and a UV absorber, etc.). Many suitable anti-aging additives are known in the art and are commercially available. For example, suitable antioxidants include phenolic antioxidants (e.g. fully-sterically hindered phenols and partially-hindered phenols) and combinations of phenolic antioxidants with stabilizers (e.g. sterically hindered amines, such as tetramethyl-piperidine derivatives, also known as "hindered amine light stabilizers" (HALS)). Suitable phenolic antioxidants include vitamin E and IRGANOX® 1010 from BASF. IRGANOX® 1010 comprises pentaerythritol tetrakis(3-(3,5-di-t-butyl-4-hydroxyphenyl)propionate). Examples of UV absorbers include phenol, 2-(2H-benzotriazol-2-yl)-6-dodecyl-4-methyl-, branched and linear (TINUVIN® 571). Examples of UV stabilizers include bis(1,2,2,6,6-pentamethyl-4-piperidyl) sebacate; methyl 1,2,2,6,6-pentamethyl-4-piperidyl/sebacate; and combinations thereof (TINUVIN® 272). These and other TINUVIN® additives, such as TINUVIN® 765 are commercially available from BASF. Other UV and light stabilizers are commercially available, and are exemplified by LowLite from Chemtura, OnCap from PolyOne, and Light Stabilizer 210 from E. I. du Pont de Nemours and Company of Delaware, U.S.A. Oligomeric (higher molecular weight) stabilizers may also be utilized in or as the anti-aging additive, for example, to minimize potential for migration of the anti-aging additive out of the sealant or a cured product thereof. Example of such oligomeric antioxidant stabilizers include TINUVIN® 622, which is a dimethylester of butanedioic acid copolymerized with 4-hydroxy-2,2,6,6-tetramethyl-1-piperidine ethanol. Examples of heat stabilizers include iron oxides, carbon blacks, iron carboxylate salts, cerium hydrates, barium zirconates, cerium and zirconium octaates, porphyrins, and the like, as well as combinations thereof.

The amount of the anti-aging additive present in the sealant depends on various factors (e.g. the amount and/or type of the (I) copolymer, an intended use of the sealant, curing conditions to which the sealant is intended to be exposed, etc.), and may be readily determined by one of skill in the art. In general, where present, the sealant comprises the anti-aging additive in an amount of from greater than 0 to 5, alternatively from 0.1 to 4, alternatively from 0.5 to 3 wt. %, based on the total weight of the sealant.

In certain embodiments, the sealant comprises a water release agent, i.e., a component that releases water over time (e.g. in response to an applied condition, such as a temperature and/or a pressure). Typically, the water release agent contains an amount of water sufficient to partially, alternatively fully, react the sealant, and is thus selected to release the amount of water when exposed to the applied condition (e.g. a use temperature of the sealant) for a sufficient amount of time. Generally, however the water release agent is selected to sufficiently bind the water to thereby prevent too much water from being released during making and/or storing the sealant. For example, the water release agent typically binds the water sufficiently during compounding/formulating the sealant, such that sufficient water is available for condensation reaction of the (I) copolymer during or after the application process in which the sealant is used. This "controlled release" property also may provide the benefit of preventing too much water from being released and/or water being released too rapidly during the application process, since this may cause bubbling or voiding in the reaction product formed by condensation reaction of the (I) copolymer of the sealant. The particular water release agent selected can depend on various factors, (e.g. the other components of the sealant, the amount/type of the (I) copolymer, the type of the (II) condensation reaction catalyst, the process conditions under which the sealant will be formulated, etc.) and will be readily determined by one of skill in the art. Examples of suitable water release agents are exemplified by metal salt hydrates, hydrated molecular sieves, and precipitated carbonates. Particular examples include the precipitated calcium carbonate available from Solvay under the trademark WINNOFIL® SPM. In certain embodiments, the water release agent is selected to include, alternatively to be, precipitated calcium carbonate. The water release agent may be selected to ensure that not all of the water content is released during compounding, while still releasing a sufficient amount of water for condensation reaction of the (I) copolymer when exposed to the application temperature range for a sufficient period of time. The amount of the water release agent present in the sealant depends on various factors (e.g. the water permeability of the (I) copolymer, a presence/absence of vehicle/solvent, a presence/absence of drying agent, the method by which the sealant is to be formulated/prepared, etc.), and may be readily determined by one of skill in the art. In general, where present, the sealant comprises the water release agent in an amount of from 1 to 50, alternatively from 5 to 40, alternatively from 5 to 30 parts by weight, based on the combined weights of all components in the sealant.

In some embodiments, the sealant comprises a pigment (i.e., a component that imparts color to the sealant and/or a reaction product thereof). Such pigments may comprise any inorganic compounds, for example those of metals such as chromium oxides, titanium oxides, cobalt pigments, as well as those that are not based on such metals, e.g. non-metal inorganic compounds. Examples of suitable pigments include indigos, titanium dioxides, carbon blacks, and combinations thereof, as well as other commercially available pigments such as Stan-Tone 505P01 Green, which is available from PolyOne. In certain embodiments, the pigment comprises a carbon black. Specific examples of carbon blacks include Shawinigan Acetylene black, which is commercially available from Chevron Phillips Chemical Company LP; SUPERJET® Carbon Black (e.g. LB-1011) supplied by Elementis Pigments Inc., of Fairview Heights, Ill. U.S.A.; SR 511 supplied by Sid Richardson Carbon Co, of Akron, Ohio U.S.A.; and N330, N550, N762, N990 (from Degussa Engineered Carbons of Parsippany, N.J., U.S.A.). The amount of the pigment present in the sealant depends on various factors (e.g. the amount and/or type of the (I) copolymer, an intended use of the sealant, a presence/absence of a vehicle/solvent, etc.), and may be readily determined by one of skill in the art. In general, where present, the sealant comprises the pigment in an amount of from greater than 0 to 20, alternatively from 0.001 to 10, alternatively from 0.001 to 5 wt. % based on the total weight of the sealant.

In certain embodiments, the sealant comprises a rheology additive, such as a rheology modifier and/or a viscosity modifier. Examples of suitable rheological additives include waxes; polyamides; polyamide waxes; hydrogenated castor oil derivatives; metal soaps, such as calcium, aluminum, and/or barium stearates; and the like, as well as derivatives, modifications, and combinations thereof. In particular embodiments, the rheology modifier is selected to facilitate incorporation of fillers, compounding, de-airing, and/or mixing of the sealant (e.g. during preparation thereof), as well understood by those of skill in the art. Specific examples of rheological additives include those known in the art which are commercially available. Examples of such rheological additives include Polyvest, which is commercially available from Evonik; Disparlon which is commercially available from King Industries; Kevlar Fibre Pulp, which is commercially available from Du Pont; Rheospan which is commercially available from Nanocor; Ircogel, which is commercially available from Lubrizol; Crayvallac® SLX, which is commercially available from Palmer Holland, and the like, as well as combinations thereof.

In some embodiments, the rheology modifier comprises, alternatively is, a wax (e.g. a paraffin wax, a microcrystalline wax, or a combination thereof). The wax typically comprises non-polar hydrocarbon(s), which may comprise branched structures, cyclic structures, or combinations thereof. Examples of suitable waxes include petroleum microcrystalline waxes available from Strahl & Pitsch, Inc., of West Babylon, N.Y., U.S.A. under the names SP 96 (melting point of from 62 to 69° C.), SP 18 (melting point of from 73 to 80° C.), SP 19 (melting point of from 76 to 83° C.), SP 26 (melting point ranging from 76 to 83° C.), SP 60 (melting point of from 79 to 85° C.), SP 617 (melting point of from 88 to 93° C.), SP 89 (melting point of from 90 to 95° C.), and SP 624 (melting point of from 90 to 95° C.). Further examples of suitable waxes include those marketed under the trademark Multiwax® by Crompton Corporation of Petrolia, Pa., U.S.A. Such waxes include which include Multiwax® 180-W, which comprises saturated branched and cyclic non-polar hydrocarbons and has melting point of from 79 to 87° C.; Multiwax® W-445, which comprises saturated branched and cyclic non-polar hydrocarbons, and has melting point of from 76 to 83° C.; and Multiwax® W-835, which comprises saturated branched and cyclic non-polar hydrocarbons, and has melting point of from 73 to 80° C. In certain embodiments, the wax comprises, alternatively is, a microcrystalline wax that is a solid at room temperature (25° C.). In some embodiments, the wax is selected to have a melting point within a desired application temperature range (i.e., the temperature range within which the sealant is intended to be used/applied). It is thought that the wax, when molten, serves as a process aid, substantially easing the incorporation of filler in the composition during compounding, the compounding process itself, as well as in during a de-airing step, if used. For example, in certain embodiments, the wax has a melt temperature below 100° C. and may facilitate mixing of parts (e.g. when the sealant is a multiple part composition) before application, even in a simple static mixer. In such instances, the wax may also facilitate application of the sealant at temperatures of from 80 to 110° C., alternatively 90 to 100° C., with good rheology.

The amount of the rheological additive present in the sealant depends on various factors (e.g. the amount and/or type of the (I) copolymer, an intended use of the sealant, curing conditions to which the sealant is intended to be exposed, a presence/absence of a vehicle/solvent, etc.), and may be readily determined by one of skill in the art. In general, where present, the sealant comprises the rheological additive in an amount of from greater than 0 to 20, alternatively from 1 to 15, alternatively from 1 to 5, parts by weight, based on the combined weights of all components in the sealant.

In certain embodiments, the sealant comprises a vehicle (e.g. a carrier vehicle, such as a solvent and/or diluent). Depending on a selection of various components of the sealant, the carrier vehicle may be, for example, an oil (e.g. an organic oil and/or a silicone oil), a solvent, water, etc. As will be understood by one of skill in the art, the particular vehicle utilized, if any, is selected to facilitate (e.g. increase) flow of the sealant or a portion thereof (e.g. one or more parts of the sealant when the sealant is a multiple-part composition); as well as the introduction of certain components (e.g. the (I) copolymer, the chainextender, the endblocker, etc.). As such, suitable vehicles are varied, and generally include those which help fluidize one or more components of the sealant, but essentially do not react with any of such components. Accordingly, the vehicle may be selected based on a solubility of one or more components of the sealant, volatility, or both. In this sense, the solubility refers to the vehicle being sufficient to dissolve and/or disperse the one or more components of the sealant, and the volatility refers to vapor pressure of the vehicle. If the vehicle is too volatile (i.e., has a vapor pressure too high for the intended use), bubbles may form in the sealant at the application temperature, which may lead to cracks and/or otherwise weaken or detrimentally affect properties of the cured product formed from the sealant. However, if the vehicle is not volatile enough (i.e., has a vapor pressure too low for the intended use) the vehicle may remain in the cured product of the sealant and/or function as a plasticizer therein. Examples of suitable vehicles generally include silicone fluids, organic fluids, and combinations thereof.

In some embodiments, the vehicle of the sealant comprises, alternatively is, a silicone fluid. The silicone fluid is typically a low viscosity and/or volatile siloxane. In some embodiments, the silicone fluid is a low viscosity organopolysiloxane, a volatile methyl siloxane, a volatile ethyl siloxane, a volatile methyl ethyl siloxane, or the like, or combinations thereof. Typically, the silicone fluid has a viscosity at 25° C. in the range of 1 to 1,000 mm$^2$/sec. In some embodiments, the silicone fluid comprises a silicone having the general formula $(R^{28}R^{29}SiO)_l$, where each $R^{28}$ and $R^{29}$ is independently selected from H and substituted or unsubstituted hydrocarbyl groups, and subscript l is from 3 to 8. Specific examples of suitable silicone fluids include hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, hexamethyldisiloxane, heptamethyloctyltrisiloxane, hexyltrimethicone, and the like, as well as derivatives, modifications, and combinations thereof. Additional examples of suitable silicone fluids include polyorganosiloxanes with suitable vapor pressures, such as from $5 \times 10^{-7}$ to $1.5 \times 10^{-6}$ m$^2$/s, include DOWSIL;® 200 Fluids and DOWSIL® OS FLUIDS, which are commercially available from Dow Silicones Corporation of Midland, Mich., U.S.A.

In certain embodiments, the vehicle of the sealant comprises, alternatively is, an organic fluid, which typically comprises an organic oil including a volatile and/or semi-volatile hydrocarbon, ester, and/or ether. General examples of such organic fluids include volatile hydrocarbon oils, such as $C_6$-$C_{16}$ alkanes, $C_8$-$C_{16}$ isoalkanes (e.g. isodecane, isododecane, isohexadecane, etc.) $C_8$-$C_{16}$ branched esters (e.g. isohexyl neopentanoate, isodecyl neopentanoate, etc.), and the like, as well as derivatives, modifications, and combinations thereof. Additional examples of suitable organic fluids include aromatic hydrocarbons, aliphatic hydrocarbons, alcohols having more than 3 carbon atoms, aldehydes, ketones, amines, esters, ethers, glycols, glycol ethers, alkyl halides, aromatic halides, and combinations thereof. Hydrocarbons include isododecane, isohexadecane, Isopar L ($C_{11}$-$C_{13}$), Isopar H ($C_{11}$-$C_{12}$), hydrogentated polydecene. Ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, octyl palmitate, and combinations thereof.

In some embodiments, the vehicle comprises, alternatively is, an organic solvent. Examples of the organic solvent include those comprising an alcohol, such as methanol, ethanol, isopropanol, butanol, and n-propanol; a ketone, such as acetone, methylethyl ketone, and methyl isobutyl ketone; an aromatic hydrocarbon, such as benzene, toluene, and xylene; an aliphatic hydrocarbon, such as heptane, hexane, and octane; a glycol ether, such as propylene glycol methyl ether, dipropylene glycol methyl ether, propylene glycol n-butyl ether, propylene glycol n-propyl ether, and ethylene glycol n-butyl ether; a halogenated hydrocarbon, such as dichloromethane, 1,1,1-trichloroethane and methylene chloride; chloroform; dimethyl sulfoxide; dimethyl formamide, acetonitrile; tetrahydrofuran; white spirits; mineral spirits; naphtha; n-methylpyrrolidone; and the like, as well as derivatives, modifications, and combination thereof.

Other vehicles may also be utilized in the sealant. For example, in some embodiments, the vehicle comprises, alternatively is, an ionic liquid. Examples of ionic liquids include anion-cation combinations. Generally, the anion is selected from alkyl sulfate-based anions, tosylate anions, sulfonate-based anions, bis(trifluoromethanesulfonyl)imide anions, bis(fluorosulfonyl)imide anions, hexafluorophosphate anions, tetrafluoroborate anions, and the like, and the cation is selected from imidazolium-based cations, pyrrolidinium-based cations, pyridinium-based cations, lithium cation, and the like. However, combinations of multiple cations and anions may also be utilized. Specific examples of the ionic liquids typically include 1-butyl-1-methylpyrrolidinium bis(trifluoromethanesulfonyl)imide, 1-methyl-1-propylpyrrolidinium bis-(trifluoromethanesulfonyl)imide, 3-methyl-1-propylpyridinium bis(trifluoromethanesulfonyl) imide, N-butyl-3-methylpyridinium bis(trifluoromethanesulfonyl)imide, 1-methyl-1-propylpyridinium bis(trifluoromethanesulfonyl)imide, diallyldimethylammonium bis (trifluoromethanesulfonyl)imide, methyltrioctylammonium bis(trifluoromethanesulfonyl)imide, 1-butyl-3-methylimidazolium bis(trifluoromethanesulfonyl)imide, 1,2-dimethyl-3-propylimidazolium bis(trifluoromethanesulfonyl)imide, 1-ethyl-3-methylimidazolium bis(trifluoromethanesulfonyl) imide, 1-vinylimidazolium·bis(trifluoromethanesulfonyl) imide, 1-allyl imidazolium bis(trifluoromethanesulfonyl) imide, 1-allyl-3-methylimidazolium bis (trifluoromethanesulfonyl)imide, lithium bis (trifluoromethanesulfonyl)imide, and the like, as well as derivatives, modifications, and combinations thereof.

The amount of the vehicle present in the sealant depends on various factors (e.g. the amount and/or type of the (1) copolymer, the manner by which the sealant was formulated, curing conditions to which the sealant is intended to be exposed, etc.), and may be readily determined by one of skill in the art. In general, where present, the sealant comprises the vehicle in an amount of from 1 to 99, alternatively from 1 to 75, alternatively from 2 to 60, alternatively from 2 to 50 wt. %, based on the total weight of the sealant.

In particular embodiments, the sealant comprises a tackifying agent. General examples of suitable tackifying agents typically include those comprising an aliphatic hydrocarbon resin (e.g. a hydrogenated polyolefin having 6 to 20 carbon atoms), a hydrogenated terpene resin, a rosin ester, a hydrogenated rosin glycerol ester, or a combination thereof. Specific examples of suitable tackifying agents include natural or modified rosins such as gum rosin, wood rosin, tall-oil rosin, distilled rosin, hydrogenated rosin, dimerized rosin, and polymerized rosin; glycerol and pentaerythritol esters of natural or modified rosins, such as glycerol esters of pale wood rosins, glycerol esters of hydrogenated rosins, glycerol esters of polymerized rosins, pentaerythritol esters of hydrogenated rosins, and phenolic-modified pentaerythritol esters of rosin; copolymers and/or terpolymers of natural terpenes, such as styrene/terpene and/or alpha methyl styrene/terpene polymers; polyterpene resins having a softening point, as determined by ASTM method E28, of from 60 to 150° C., such as those produced via the polymerization of terpene hydrocarbons (e.g. pinene) in the presence of Friedel-Crafts catalysts, as well as the hydrogenation products thereof (e.g. hydrogenated polyterpenes); phenolic modified terpene resins and hydrogenated derivatives thereof, such as those produced via acid-mediated condensation of a bicyclic terpene and a phenol; aliphatic petroleum hydrocarbon resins, such as those produced via the polymerization of monomers consisting of primarily of olefins and diolefins, those having a ring and ball softening point of from 60 to 135° C., and also hydrogenated aliphatic petroleum hydrocarbon resins; alicyclic petroleum hydrocarbon resins and hydrogenated derivatives thereof; aliphatic/aromatic or cycloaliphatic/aromatic copolymers and hydrogenated derivatives thereof; and combinations thereof. In some embodiments, the sealant comprises a solid tackifying agent (i.e., a tackifying agent having a ring and ball softening point above 25° C.). Other examples of suitable tackifying agents include commercially available varieties, such as the aliphatic hydrocarbon resins exemplified by ESCOREZ 1102, 1304, 1310, 1315, and 5600 from Exxon Chemical, and Eastotac H-100, H-115E, and H-130L from Eastman; the hydrogenated terpene resins exemplified by Arkon P 100 from Arakawa Chemicals, and Wingtack 95 from Goodyear; the hydrogenated rosin glycerol esters exemplified by Staybelite Ester 10 and Foral from Hercules; the polyterpenes exemplified by Piccolyte A125 from Hercules; the aliphatic/ aromatic and/or cycloaliphatic/aromatic resins exemplified by ECR 149B and ECR 179A from Exxon Chemical; and combinations thereof. The amount of the tackifying agent present in the sealant depends on various factors (e.g. the amount and/or type of the (I) copolymer, the type and/or amount of other components of the sealant, an intended use of the sealant, etc.), and may be readily determined by one of skill in the art. In general, where present, the sealant comprises the tackifying agent in an amount of from 1 to 20 parts by weight, based on the combined weights of all components in the sealant.

In certain embodiments, the sealant comprises a corrosion inhibitor. Examples of suitable corrosion inhibitors include benzotriazoles, mercaptabenzotriazoles, and the like, as well as combinations thereof. Specific examples of suitable corrosion inhibitors are known in the art and commercially available, such as CUVAN® 826 (e.g. a 2,5-dimercapto-1, 3,4-thiadiazole derivative) and CUVAN® 484 (an alkylthiadiazole), which are available from R. T. Vanderbilt of Norwalk, Conn., U.S.A.

The amount of the corrosion inhibitor present in the sealant depends on various factors (e.g. the amount and/or type of the (I) copolymer, an intended use of the sealant, curing conditions to which the sealant is intended to be exposed, etc.), and may be readily determined by one of skill in the art. In general, where present, the sealant comprises the corrosion inhibitor in an amount of from 0.05 to 0.5 wt. % based on total weight of the sealant.

As introduced in various sections above, various components of the sealant may be utilized for multiple purposes, and thus certain additives may overlap with regard to the components described herein. For example, certain alkoxysilanes may be useful as filler treating agents, as adhesion promoters, and as crosslinkers. Additionally, the sealant may further comprise additional additives not described above, such as catalyst inhibitors, curing promotors, color-change additives, etc. Such additional additives are independently selected, and each utilized in the sealant in an amount selected based on the indented use thereof, as readily determined by one of skill in the art. Typically, where present, the sealant comprises each of such additional additives in an amount of from 0.001 to 10, alternatively from 0.01 to 5, alternatively from 0.1 to 1 wt. % based on total weight of the sealant.

As described above, the sealant may be prepared as a one-part composition, or as a multiple-part composition (e.g. comprising 2, 3, 4, or more parts). For example, in some embodiments, the sealant is prepared as the one-part composition, which may be prepared by combining all components together by any convenient means, such as mixing. Such a one-part composition may be made by optionally combining (e.g. premixing) the (I) copolymer with various additives (e.g. the filler) to form an intermediate mixture, and subsequently combining (e.g. via mixing) the intermediate mixture with a pre-mix comprising the (II) condensation reaction catalyst and other various additives to form a sealant mixture or the sealant. Other additives (e.g. the anti-aging additive, the pigment, etc.) may be added to the sealant at any desired stage, such as via combination with the intermediate mixture, the pre-mix, or the sealant mixture. As such, a final mixing step may be performed (e.g. under substantially anhydrous conditions) to form the sealant, which is typically stored under substantially anhydrous conditions, for example in sealed containers, until ready for use.

In some embodiments, the sealant is prepared as the multiple-part composition (e.g. when the crosslinker is utilized). In such embodiments, the (II) condensation reaction catalyst and the crosslinker are typically stored in separate parts, which are combined shortly before use of the sealant. For example, the sealant may comprise a two part curable composition prepared by combining the (I) copolymer and the crosslinker to form a first (i.e., curing agent) part by any convenient means (e.g. mixing). A second (i.e., base) part may be prepared by combining the (II) condensation reaction catalyst and (I) copolymer by any convenient means (e.g. mixing). The components may be combined at ambient or elevated temperature and under ambient or anhydrous conditions, depending on various factors, e.g. whether a one part or multiple part composition is selected. The base part and curing agent part may then be combined by any convenient means, such as mixing, shortly before use. The base part and curing agent part may be combined in a 1:1 ratio, or in a relative amount of base: curing agent ranging from 1:1 to 10:1.

The equipment used for mixing the components of the sealant is not specifically restricted, and is typically selected depending on the type and amount of each component selected for use in the sealant or a part thereof (collectively, the "sealant compositions".) For example, agitated batch kettles may be used for relatively low viscosity sealant compositions, such as compositions that would react to form gums or gels. Alternatively, continuous compounding equipment (e.g. extruders, such as twin screw extruders) may be used for more viscous sealant compositions, as well as sealant compositions containing relatively high amounts of particulates. Exemplary methods that can be used to prepare the sealant compositions described herein include those disclosed in, for example, U.S. Patent Publication Nos. 2009/0291238 and 2008/0300358, which portions are herein incorporated by reference.

The sealant compositions made as described above may be stable when stored in containers that reduce or prevent exposure of the sealant compositions to moisture. However, the sealant compositions, may react via condensation reaction when exposed to atmospheric moisture. Additionally, when the water release agent is utilized, the sealant compositions may react via condensation reaction without exposure to atmospheric moisture.

A cured product is also provided. The cured product is formed from the sealant. More specifically, the cured product is formed by curing the sealant, e.g. via the condensation reaction described above.

A composite article comprising the cured product is also provided. More specifically, the composite article comprises a substrate and the cured product disposed on the substrate. The composite article is formed by disposing the sealant on the substrate, and curing the sealant to give the cured product on the substrate, thereby preparing the composite article. The substrate is exemplified by, for example, an exterior building façade.

A method of sealing a space defined between two elements is also disclosed. This method comprises applying the sealant to the space, and curing the sealant in the space, thereby sealing the space.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention. Table 1 below sets forth abbreviations as utilized in the Examples.

TABLE 1

Abbreviations

| Abbreviation | Meaning/ Definition |
|---|---|
| 0-0719 | Complex of Pt with 1,3-diethenyl-1,1,3,3-tetramethyldisiloxane |
| Polyether Compound | Monoallyl Terminated Hydroxyl PPO, 800 Mw |
| MM | Hexamethyldisiloxane |
| ETM | Trimethoxysilylethyl tetramethyldisiloxane (~65% β-form and 35 % α-form) |
| ETM linear | Trimethoxysilylethyl tetramethyldisiloxane (>95% β-form) |
| T-9 | Stannous Octoate |
| T-12 or DBTL | Dibutyltin Dilaureate |
| IPDI | Isophorone Diisocyanate |
| Polycarbonate Compound | Hydroxyl terminated Polycarbonate, 1900 Mw, Ravecarb 292, Austin Chemicals |
| PDMS-Carbinol | Carbinol terminated PDMS, 1100 Mn |
| Polycaprolactone-PDMS | Hydroxyl terminated caprolactone-PDMS-caprolactone block copolymer, 6100 Mw |
| Polyester Compound | Hydroxyl terminated Polycaprolactone, 2200 Mw |
| Polyacrylate | Hydroxyl terminated Polyacrylate, 10000 Mw, on average 9-12 |
| Polyol | hydroxyl groups per molecule |
| EtAc | Ethyl Acetate |
| DINP | Diisononyl Phthalate |
| VTM | Vinyltrimethoxysilane |
| IPTES | Isocyanatopropyl triethoxysilane |
| Z-6020 | N-(β-aminoethyl)-γ-aminopropyltrimethoxysilane |
| CC | Precipitated calcium carbonate |
| CS-11 | Ground calcium carbonate |
| NMR | Nuclear Magnetic Resonance |
| FTIR | Fourier Transform Infra-Red |
| NCO | Isocyanate Functional Group |
| mL | Milliliters |
| ° C. | Degrees Celsius |
| mg | Milligrams |
| Mn | Number Average Molecular Weight |
| Mw | Weight Average Molecular Weight |
| N/A | Not Available (not measured) |

Example 1: Preparation of Silicone-Organic Copolymer 1

Silicone-Polycaprolactone-Urethane Copolymer

A dry 4 neck flask is placed into a temperature controlled heating block and fitted with a mechanical stirrer, thermometer, dropping funnel, and reflux condenser. The flask is purged with $N_2$, and 141.9 grams of Polycaprolactone-PDMS dissolved in 200 grams of EtAc is added, followed by 8.4 grams of IPTES. The flask is heated to 50° C. and catalyzed with 0.04 grams of DBTDL. The exotherm is controlled such that the reaction temperature is kept below 70° C. until the reaction is deemed complete, i.e., until no NCO is detectable by FTIR. A reaction product including the silicone-polycaprolactone-urethane copolymer is then cooled to room temperature and stored in a container under nitrogen. Once complete, the contents of the flask are then cooled to room temperature and packaged to a Nalgene-container under $N_2$ flow. The finished material is referred to as the silicone-organic copolymer 1.

Example 2: Preparation of Silicone-Organic Copolymer 2

Silicone-Polyacrylate-Urethane Copolymer

A dry 4 neck flask is placed into a temperature controlled heating block and fitted with a mechanical stirrer, thermometer, dropping funnel, and reflux condenser. The flask is purged with $N_2$, and 1.31 grams of IPDI and 6.5 grams of PDMS-Carbinol are disposed in the flask via the dropping funnel. The flask is heated to 50° C. and catalyzed with 0.01 grams of DBTDL. The exotherm is controlled in a way that the reaction temperature is kept below 70° C. The contents of the flask are then heated to 65° C. and the reaction is monitored by IR. When the target % NCO is reached (4.9 to 5.1 wt. %), 135.5 grams of the Polyacrylate Compound dissolved in 10.0 grams of EtAc is added via the dropping funnel. The mixture is reacted and monitored by FTIR to check for the disappearance of NCO, after which the contents of the flask are cooled to ambient temperature. 11.2 grams of IPTES and 0.1 grams of DBTDL are added to the flask. The contents of the flask are is heated to 65° C. and monitored by FTIR to check for the complete disappearance of NCO after which the reaction is stopped. Once complete, the reaction mixture is cooled, transferred into a one neck round bottom flask, and stripped of any volatiles under vacuum (rotary evaporator, 80° C.). The contents of the flask are then cooled to room temperature and packaged to a Nalgene-container under $N_2$ flow. The finished material is referred to as the silicone-organic copolymer 2.

The viscosity, Mn (GPC), and Mw (GPC), and polydispersity (PD) of silicone-organic copolymer 1 are determined, and set forth in Table 2 below.

TABLE 2

Viscosity and GPC Evaluation of Example 2

| Silicone-organic Copolymer 2 | Viscosity [mPa · sec] Shear Rate 2 sec$^{-1}$, 25° C. | Mn (GPC) | Mw (GPC) | PD |
|---|---|---|---|---|
| Example 2 | Not measured, solid at RT | 1980 | 7320 | 3.69 |

Example 3: Preparation of Silicone-Organic Copolymer 3

Silicone-Polycarbonate-Urethane Copolymer

A dry 4 neck flask is placed into a temperature controlled heating block and fitted with a mechanical stirrer, thermometer, dropping funnel, and reflux condenser. The flask is purged with $N_2$, and 10.0 grams of IPDI and 42.9 grams of the Polycarbonate Compound dissolved in 10.0 grams of EtAc are disposed in the flask via the dropping funnel. The flask is heated to 50° C. and catalyzed with 0.01 grams of DBTDL. The exotherm is controlled in a way that the reaction temperature is kept below 70° C. The contents of the flask are then heated to 65° C. and the reaction is monitored by IR. When the target % NCO is reached (3 to 3.5 wt. %), 48.1 grams of PDMS Carbinol dissolved in 10.0 grams of EtAc is added via the dropping funnel. The mixture is reacted and monitored by FTIR to check for the disappearance of NCO, after which the contents of the flask are cooled to ambient temperature. 11.2 grams of IPTES and 0.1 grams of DBTDL are added to the flask. The contents of the flask are is heated to 65° C. and monitored by FTIR to check for the complete disappearance of NCO after which the reaction is stopped. The contents of the flask are then cooled to room temperature and packaged to a Nalgene-container under $N_2$ flow. The finished material is referred to as the silicone-organic copolymer 3.

The viscosity, Mn (GPC), and Mw (GPC), and polydispersity (PD) of silicone-organic copolymer 3 are determined, and set forth in Table 3 below.

TABLE 3

| Viscosity and GPC Evaluation of Example 3 | | | | |
|---|---|---|---|---|
| Silicone-organic Copolymer 3 | Viscosity [mPa · sec] Shear Rate 2 sec$^{-1}$, 25° C. | Mn (GPC) | Mw (GPC) | PD |
| Example 3 | 82400 | 5550 | 13100 | 2.36 |

Example 4: Preparation of Silicone-Organic Copolymer 4

Silicone-Polycarbonate-Urethane Copolymer

A dry 4 neck flask is placed into a temperature controlled heating block and fitted with a mechanical stirrer, thermometer, dropping funnel, and reflux condenser. The flask is purged with $N_2$, and 10.9 grams of IPTES is disposed therein. 126.0 grams of Polycarbonate Compound and 42.9 grams of PDMS Carbinol in 400 grams of EtAc are added via the dropping funnel. The flask is heated to 50° C. and catalyzed with 0.01 grams of DBTDL. The exotherm is controlled in a way that the reaction temperature is kept below 70° C. The uniform mixture is then heated to 65° C. and the reaction is monitored by FTIR to check for the disappearance of NCO. After the complete disappearance of NCO, the flask is cooled to ambient temperature and 19.6 grams of IPDI and 0.1 grams of DBTDL is added to the mixture. The mixture is reacted at 65° C. and monitored by FTIR to check for the complete disappearance of NCO after which the reaction is stopped. The contents of the flask are then cooled to room temperature and packaged to a Nalgene-container under $N_2$ flow. The finished material is referred to as the silicone-organic copolymer 4.

The viscosity, Mn (GPC), and Mw (GPC), and polydispersity (PD) of silicone-organic copolymer 4 are determined, and set forth in Table 4 below.

TABLE 4

| Viscosity and GPC Evaluation of Example 4 | | | | |
|---|---|---|---|---|
| Silicone-organic Copolymer 4 | Viscosity [mPa · sec] Shear Rate 2 sec$^{-1}$, 25° C. | Mn (GPC) | Mw (GPC) | PD |
| Example 4 | Not measured | 6150 | 27800 | 4.27 |

Example 5: Cured Products

A reaction vessel containing the silicone-organic copolymer 1 (30 g) is heated to 65° C., and then charged with a condensation reaction catalyst (T-12, 0.3 wt. %), a plasticizer (DINP, 8 wt. %), a crosslinker (VTM, 1.22 wt. %), and an adhesion promotor (Z-6020, 0.5 wt. %). The reaction mixture is then held at 65° C. for 48 hours. The mixture is then cast into a Teflon mold 15 cm by 15 cm in size and 3 mm deep. The cast plate is then stored in an environmentally controlled room (50% relative humidity, 25° C.) for 12 days before being flipped over, stored for 1 day, and then moved into an air circulating oven set to 80° C. for 2 days to give a cured product. The cured product is taken out of the oven and cooled to room temperature.

A reaction vessel containing the silicone-organic copolymer 2 (30 g) is heated to 80° C., and then charged with a condensation reaction catalyst (T-12, 0.1 wt. %), a crosslinker (VTM, 1.22 wt. %), and an adhesion promotor (Z-6020, 0.5 wt. %). The reaction mixture is then held at 65° C. for 48 hours. The mixture is then cast into a Teflon mold 15 cm by 15 cm in size and 3 mm deep. The cast plate is then stored in an environmentally controlled room (50% relative humidity, 25° C.) for 7 days, then moved to an 80° C. oven and cured at this temperature for 7 more days. The cast plaque is then flipped over, stored at room temperature in the humidity room for 24 hours, and cured again at 80° C. for 48 hours. The cured product is taken out of the oven and cooled to room temperature.

Into a polypropylene bottle containing the silicone-organic copolymer 3 (30 g) is charged with a condensation reaction catalyst (T-12, 0.1 wt. %), a crosslinker (VTM, 1.22 wt. %), and an adhesion promotor (Z-6020, 0.5 wt. %). The mixture is mixed manually with a stainless steel spatula and is stored at room temperature for four days. The mixture is then cast into a Teflon mold 15 cm by 15 cm in size and 3 mm deep. The cast plate is then stored in an environmentally controlled room (50% relative humidity, 25° C.) for 7 days. The silicone-organic copolymer 4 is cured nicely and moved out of the humidity room for testing.

A polypropylene bottle containing the silicone-organic copolymer 4 (30 g) is heated to 65° C. and held at the temperature for 2 hours. Into the heated bottle is charged with a condensation reaction catalyst (T-12, 0.2 wt. %), a crosslinker (VTM, 1.22 wt. %), and an adhesion promotor (Z-6020, 0.5 wt. %). The mixture is mixed manually with a spatula and stored at 65 at room temperature for 3 days. The mixture is then cast into a Teflon mold 15 cm by 15 cm in size and 3 mm deep. The cast plate is then stored in an environmentally controlled room (50% relative humidity, 25° C.) for 7 days. The silicone-organic copolymer 4 is cured nicely and moved out of the humidity room for testing.

Tensile Analysis

Dogbone specimens (5 cm total length, 2 cm neck length) are cut (stamped) from the cured product with a carbon steel die for tensile testing. The tensile properties of the dogbone specimens are then analyzed. A MTS testing frame with a load cell of 1000 N full capacity is used for the test. The testing speed is 50 cm/min. The strain is calculated as the displaced over the length of the narrow neck. Stress at break is calculated by dividing the peak stress with the initial cross-sectional area of the narrow neck region. Some of the cured products were also aged in a heated air circulating oven at 60° C. or 80° C. for a certain length of time, and tensile tested to gauge the stability thereof.

Differential Scanning Calorimetry (DSC)

Small pieces are cut from the cured product for differential scanning calorimetry (DSC). DSC is performed with a TA Instrument Discovery Series DSC2500. The sample is weighed into Tzero aluminum pans (~10 mg of sample) and analyzed on the instrument, the temperature is first ramped down to −180° C. (at 10° C./min) and then up to 200° C. (at 10° C./min). The heat needed to keep up with the ramping process is recorded and the Tg is detected as an abrupt change in heat capacity.

Tack Free Time

Tack free time is measured using a Gardco BK six track drying time recorder for coatings according to ASTM D5895, by coating a 150 micrometer thick, 12 mm wide coating layer on an aluminum strip, placing a needle into the coating layer with a weight of 5 g applied on the top of the needle, and dragging the needle through the coating. Observation of the track left behind over a period of time determines the tack free time.]

Hardness

Hardness is measured with a Zwick Roell Hardness tester with a 12.5 N force applied. The OO scale is utilized.

Properties measured from the cured products are listed in Table 5 below.

TABLE 5

| Example | Tack Free time (hr) | 25% Strain Modulus (psi) | 100% Strain Modulus (psi) | Young's Modulus (psi) | Elongation at Break (%) | Strength at Break (psi) | Type OO Hardness |
|---|---|---|---|---|---|---|---|
| 1 | N/A | 434.6 ± 13.8 | N/A | 3261 ± 177 | 30.3 ± 3.4 | 456.4 ± 24.8 | 97.6 |
| Example 1 aged at 60° C. for 7 days | N/A | 459.0 ± 16.7 | N/A | 3536.4 ± 58.6 | 36.0 ± 8.5 | 496.2 ± 41.4 | 98 |
| Example 1 aged at 80° C. for 7 days | N/A | 375.7 ± 4.1 | N/A | 2731.5 ± 69.9 | 39.4 ± 1.9 | 431.5 ± 1.1 | 97 |
| 2 | N/A | 287.6 ± 37.0 | 186.4 ± 16.3 | N/A | 7.7 ± 2.0 | 144.3 ± 16.3 | 95.2 |
| 3 | 15 h | 31.9 ± 0.5 | N/A | 179.4 ± 36.5 | 92.4 ± 13.6 | 112.1 ± 24.0 | 86.4 |
| Example 3 aged at 60° C. for 7 days | N/A | 77.3 ± 1.7 | N/A | 373.0 ± 13.6 | 54.1 ± 9.0 | 148.3 ± 25.2 | 91 |
| Example 3 aged at 80° C. for 7 days | N/A | 86.5 ± 4.0 | N/A | 415.3 ± 7.2 | 52.9 ± 5.2 | 164.5 ± 19.0 | 94 |
| 4 | 17 h 30 min. | 18.3 ± 0.7 | 40.8 ± 1.5 | 175.6 ± 34.9 | 256.4 ± 19.8 | 195.7 ± 8.3 | 77.5 |
| Example 4 aged at 60° C. for 7 days | N/A | 39.0 ± 1.0 | 96.0 ± 3.1 | 158.9 ± 4.4 | 135.6 ± 10.1 | 134.8 ± 10.1 | 87 |

Example 6

Sealant Example 6 was prepared using the silicone-organic compound synthesized in Example 4. Prior to compounding, a pre-mix solution of Z-6020 and DBTDL are combined in a one ounce glass vial. This solution is shaken by hand until a clear straw solution is obtained and set aside for later use. The silicone-polycarbonate polymer is warmed in a 70° C. oven until flowable. At any point during the mixing process, additional mixing steps of 30 seconds at 2000 rpm are performed if the material started to thicken as the silicone-polycarbonate copolymer cooled. A max 300 long mixing jar designed for use with the DAC 600.2 VAC SpeedMixer is tared on a balance and then the silicone-polycarbonate copolymer, DINP, and VTM are added. This is mixed at 800 rpm for 30 seconds and then 1500 rpm for 30 seconds. CC is then added to the mixing jar and allowed to mix for 30 seconds at 800 rpm, removed from the mixer and the jar scraped by hand, and reinserted to mix for an additional 30 seconds at 1500 rpm. After this mixing step, CS-11 is weighed into the mixing jar and the jar placed back into the mixer, and allowed to mix for 30 seconds at 1300 rpm. The jar is then removed, hand scraped to re-incorporate any particles of filler, and then placed back into the mixer for 30 seconds at 2000 rpm. After filler incorporation, the premix solution previously prepared is added to the mixing jar and then allowed to mix for 30 seconds at 1300 rpm after which the jar is removed and hand scraped. Finally, the jar lid is replaced with one with a hole in the center to allow entrapped air or volatiles to escape the mixing jar for the vacuum step. A final mixing step is performed with vacuum according to the following program: 37 seconds of mixing at 800 rpm to 3.5 psi vacuum, 40 seconds of mixing at 1300 rpm holding 3.5 psi vacuum, and 35 seconds of mixing at 800 rpm to break vacuum to ambient laboratory conditions. A sealant mixture is then packaged into a SEMCO cartridge and set aside for testing.

The sealant mixture is set forth below in Table 6. The amount of VTM, Z-6020, and DBTDL are adjusted during compounding to meet the total target weight percent values of the sealant mixture to account for the incoming amounts in the polymers previously synthesized.

TABLE 6

| Ingredient | % by weight |
|---|---|
| Silicone-organic copolymer 4 | 32.89 |
| DINP | 8.09 |
| CC | 39.47 |
| CS-11 | 17.73 |
| VTM | 1.22 |
| DBTDL | 0.1 |
| Z-6020 | 0.5 |

The physical and curing properties of Example 6 are evaluated in accordance with the following respective procedures:

Tack Free Time: A 100 mil thick slab of the particular sealant is drawn down on a piece of polyethylene terephthalate (PET). A small strip of PET is then lightly pressed onto the surface of the particular sealant to check for cure. When no sealant is transferred to the strip of PET, the sealant is considered tack free.

Extrusion Rate: A SEMCO Nozzle Type 440 is affixed to a 6-oz SEMCO tube. A brief extrusion is performed to fill the extrusion nozzle. Material is then allowed to extrude for 3 seconds at an applied pressure of 90 psi and the material is collected into a tared container to measure the mass extruded. Extrusion rate is then calculated in grams per minute. The extrusion rate is then calculated in grams per minute as an average of the three data points.

The particular sealant is cured at 50% relative humidity and 23° C. for seven days. Durometer is measured by ASTM Method D2240, Type A. Tensile, Elongation, and Modulus are measured by ASTM Method D412. Physical properties of the sealant of Example 6 are set forth in Table 7 below. Prior to testing, the sealant cartridge is warmed for 45 minutes in an oven at 60° C.

TABLE 7

| Property | Unit | Sealant Example 6 |
| --- | --- | --- |
| Extrusion Rate | g/min | 111 |
| Slump | inches | 0.1 |
| Skin Over Time | minutes | 2 |
| Tack Free Time | hours | >4 |
| Durometer | Shore A | 22 |
| Tensile | psi | 98 |
| Elongation | 0 | 284 |
| 25% Modulus | psi | 18 |
| 100% Modulus | psi | 53 |

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A silicone-organic copolymer having the formula:

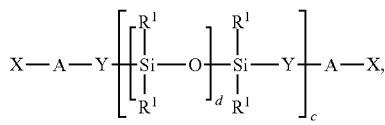

wherein each Y comprises an independently selected organic moiety selected from polycarbonate moieties, polyester moieties, and polyacrylate moieties;
wherein each X is independently a silicone moiety having formula $-D^1-SiR^1_a(OR)_{3-a}$; where each $D^1$ is an independently selected divalent group; each $R^1$ is an independently selected substituted or unsubstituted hydrocarbyl group having from 1 to 18 carbon atoms; each R is an independently selected alkyl group having from 1 to 10 carbon atoms; and each subscript a is independently selected from 0 to 2;
wherein each subscript d is from 1 to 1000;
wherein subscript c is from 1 to 150; and
wherein each A is independently selected from a covalent bond, $-D^2-O-C(=O)-NH-$, $-D^2-NH-C(=O)-NH-$, $-D^2-NR^2-CH_2CH_2C(=O)O-$, and $-D^2-OC(=O)-CH_2CH_2NR^2-$, where $D^2$ is a divalent group and $R^2$ is H or $R^1$, where $R^1$ is defined above.

2. The silicone-organic copolymer of claim 1, wherein at least one Y comprises a second moiety different from the organic moiety.

3. The silicone-organic copolymer of claim 2, wherein the second moiety is selected from an alkylaluminoxane moiety, an alkylgermoxane moiety, a polythioester moiety, a polyether moiety, a polythioether moiety, a polyester moiety, a polyacrylonitrile moiety, a polyacrylamide moiety, a polycarbonate moiety, a polyacrylate moiety, an epoxy moiety, a polyurethane moiety, a polyurea moiety, a polyacetal moiety, a polyolefin moiety, a polyvinyl alcohol moiety, a polyvinyl ester moiety, a polyvinyl ether moiety, a polyvinyl ketone moiety, a polyisobutylene moiety, a polychloroprene moiety, a polyisoprene moiety, a polybutadiene moiety, a polyvinylidiene moiety, a polyfluorocarbon moiety, a polychlorinated hydrocarbon moiety, a polyalkyne moiety, a polyamide moiety, a polyimide moiety, a polyimidazole moiety, a polyoxazole moiety, a polyoxazine moiety, a polyoxidiazole moiety, a polythiazole moiety, a polysulfone moiety, a polysulfide moiety, a polyketone moiety, a polyetherketone moiety, a polyanhydride moiety, a polyamine moiety, a polyimine moiety, a polyphosphazene moiety, a polysaccharide moiety, a polypeptide moiety, a polyisocyanate moiety, a cellulosic moiety, and combinations thereof.

4. A method of preparing a silicone-organic copolymer, said method comprising:
reacting an organic compound having on average more than one unsaturated group, a chain extending organosilicon compound having on average more than one silicon-bonded hydrogen atom, and an endcapping organosilicon compound, in the presence of a hydrosilylation catalyst to give the silicone-organic copolymer;
wherein the silicone-organic copolymer is the silicone-organic copolymer of claim 1; and
wherein A is the covalent bond.

5. The method of claim 4, further comprising reacting a second compound having on average more than one unsaturated group with the organic compound, the chain extending organosilicon compound, and the endcapping organosilicon compound in the presence of the hydrosilylation catalyst.

6. The method of claim 4, wherein the organic compound has the formula:

$Y[R^2]_i$, wherein each $R^2$ is an independently an acrylate group or an unsaturated group having from 2 to 14 carbon atoms; subscript i is >1; and Y comprises an organic moiety selected from polycarbonate moieties, polyester moieties, and polyacrylate moieties.

7. The method of claim 4, wherein the chain extending organosilicon compound comprises the linear silicon hydride functional organosilicon compound, and wherein the linear silicon hydride functional organosilicon compound has the formula:

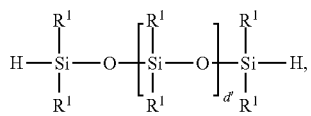

wherein each $R^1$ is an independently selected substituted or unsubstituted hydrocarbyl group having from 1 to 18 carbon atoms; and each subscript d' is from 1 to 999.

8. The method of claim 4, wherein the endcapping organosilicon compound has the formula $HSiR^1_a(OR)_{3-a}$, where each $R^1$ is an independently selected substituted or unsubstituted hydrocarbyl group having from 1 to 18 carbon atoms; each R is an independently selected alkyl group having from 1 to 10 carbon atoms; and each subscript a is independently selected from 0 to 2.

9. A method of preparing a silicone-organic copolymer, said method comprising:
reacting an organic compound having one terminal unsaturated group and one terminal hydroxyl group with an endcapping organosilicon compound in the presence of a hydrosilylation catalyst to give a hydroxyl-functional intermediate;
reacting the hydroxyl-functional intermediate with a polyisocyanate to give an isocyanate-functional intermediate; and
reacting the isocyanate-functional intermediate and a chain extending organosilicon compound having two hydroxyl groups to give the silicone-organic copolymer;
wherein the silicone-organic copolymer is the silicone-organic copolymer of claim 1; and
wherein A is the covalent bond.

10. A method of preparing a silicone-organic copolymer, said method comprising:
reacting an organic compound having on average more than one hydroxyl group, a chain extending organosilicon compound having on average more than one hydroxyl group, a polyisocyanate compound, and an endcapping organosilicon compound having at least one isocyanate-functional group, to give the silicone-organic copolymer;
wherein the silicone-organic copolymer is the silicone-organic copolymer of claim 1; and
wherein A is selected from $D^2$-O—C(=O)—NH— or -$D^2$-NH—C(=O)—NH—, where $D^2$ is a divalent group and $R^2$ is H or $R^1$, where $R^1$ is defined above.

11. A sealant, comprising:
a silicone-organic copolymer; and
a condensation reaction catalyst;
wherein the silicone-organic copolymer is the silicone-organic copolymer of claim 1.

12. The sealant of claim 11, further comprising: (i) a filler; (ii) a filler treating agent; (iii) a cross-linker; (iv) a surface modifier, (v) a drying agent; (vi) an extender; (vii) a biocide; (viii) a flame retardant; (ix) a plasticizer; (x) an end-blocker; (xi) a binder; (xii) an anti-aging additive; (xiii) a water release agent; (xiv) a pigment; (xv) a rheology modifier; (xvi) a carrier; (xvii) a tackifying agent; (xviii) a corrosion inhibitor; (xix) a catalyst inhibitor; (xx) an adhesion promotor; (xxi) a viscosity modifier; (xxii) a UV absorber; (xxiii) an anti-oxidant; (xxiv) a light-stabilizer; or (xxv) a combination of (i)-(xxiv); or optionally, further comprising a filler, a cross-linker, an extender, a plasticizer, and an adhesion promotor.

13. A cured product of the sealant of claim 11.

14. A composite article comprising a substrate and the cured product of claim 13 disposed on the substrate.

15. A method of preparing a composite article, said method comprising:
disposing a sealant on a substrate; and
curing the sealant to give a cured product on the substrate, thereby forming the composite article;
wherein the sealant is the sealant of claim 11.

16. A method of sealing a space defined between two elements, said method comprising:
applying a sealant to the space; and
curing the sealant in the space, thereby sealing the space;
wherein the sealant is the sealant of claim 11.

* * * * *